(12) United States Patent
Simmons et al.

(10) Patent No.: US 7,199,180 B1
(45) Date of Patent: *Apr. 3, 2007

(54) ADHESIVES COMPRISING OLEFIN POLYMERS

(75) Inventors: Eugene R. Simmons, Vadnais Heights, MN (US); William L. Bunnelle, Ham Lake, MN (US); David B. Malcolm, Maplewood, MN (US); Keith C. Knutson, St. Paul, MN (US); Thomas F. Kauffman, Harleysville, PA (US); Mark S. Kroll, Arden Hills, MN (US); Michael S. Keehr, Blaine, MN (US); Deepak R. Parikh, Singapore (SG); Jimmy D. Allen, Brazoria, TX (US); David R. Speth, Upper Arlington, OH (US); Selim Yalvac, Pearland, TX (US); Malcolm F. Finlayson, Houston, TX (US); Cynthia L. Rickey, Lake Jackson, TX (US)

(73) Assignees: The Dow Chemical Company, Midland, MI (US); H.B. Fuller Licensing & Financing Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/973,779

(22) PCT Filed: Mar. 14, 1997

(86) PCT No.: PCT/US97/04161

§ 371 (c)(1),
(2), (4) Date: Jan. 8, 1998

(87) PCT Pub. No.: WO97/33921

PCT Pub. Date: Sep. 18, 1997

Related U.S. Application Data

(63) Continuation of application No. 08/615,750, filed on Mar. 14, 1999, now abandoned, and a continuation of application No. 08/616,406, filed on Mar. 14, 1996, now abandoned.

(51) Int. Cl.
*B60C 1/00* (2006.01)

(52) U.S. Cl. .................... 524/570; 524/271; 524/274; 524/482; 524/484; 524/485; 524/486; 524/487; 524/505; 524/522; 524/523; 524/524; 524/528; 524/579

(58) Field of Classification Search .............. 524/579, 524/271, 274, 482, 484, 485, 486, 487, 505, 524/522, 523, 524, 528, 570

See application file for complete search history.

(56) References Cited

U.S. PATENT DOCUMENTS

| 3,253,059 | A | 5/1966 | Vollmer et al. ............. 260/897 |
|---|---|---|---|
| 4,914,253 | A | 4/1990 | Chang .................... 585/523 |
| 4,956,207 | A | 9/1990 | Kauffman et al. ......... 428/34.2 |
| 5,023,388 | A | 6/1991 | Luker |
| 5,055,438 | A * | 10/1991 | Canich ..................... 502/117 |
| 5,272,236 | A | 12/1993 | Lai et al. ................. 526/348.5 |
| 5,278,272 | A | 1/1994 | Lai et al. ................. 526/348.6 |
| 5,377,843 | A | 1/1995 | Schumacher ............. 209/139.2 |
| 5,530,054 | A | 6/1996 | Tse et al. ................... 524/474 |
| 5,548,014 | A | 8/1996 | Tse et al. ................... 525/240 |
| 5,591,792 | A * | 1/1997 | Hattori et al. ............. 524/505 |
| 5,723,705 | A | 3/1998 | Herrmann et al. |
| 6,008,262 | A | 12/1999 | McKay et al. |
| 6,054,544 | A | 4/2000 | Finlayson et al. |
| 6,120,887 | A | 9/2000 | Werenicz et al. |
| 6,221,448 | B1 | 4/2001 | Baetzold |
| 6,300,398 | B1 | 10/2001 | Jialanella et al. |
| 6,319,979 | B1 | 11/2001 | Dubois et al. |
| 6,323,285 | B1 | 11/2001 | Johnston et al. |
| 6,335,410 | B1 | 1/2002 | Finlayson et al. |
| 6,339,112 | B1 | 1/2002 | Kauffman et al. |
| 6,462,154 | B1 | 10/2002 | Naganuma et al. |
| 6,534,572 | B1 | 3/2003 | Ahmed et al. |
| 6,579,915 | B2 | 6/2003 | Kroll et al. |
| 6,582,829 | B1 | 6/2003 | Quinn et al. |
| 6,657,000 | B1 * | 12/2003 | De Keyzer et al. ......... 524/505 |

(Continued)

FOREIGN PATENT DOCUMENTS

EP 0 115 434 8/1984

(Continued)

OTHER PUBLICATIONS

International Search Report dated Jul. 3, 1997 issued by the EPO acting as the International Searching Authority in PCT US97/04161.

(Continued)

*Primary Examiner*—Peter D. Mulcahy

(57) ABSTRACT

Disclosed are adhesives and processes for preparing the same, comprising at least one first homogeneous ethylene/α-olefin interpolymer, and optionally at least one tackifier, and optionally at least one plasticizer. The claimed adhesives are useful as adhesives such as are employed in various applications, such as in masking tape, clear office tape, labels, decals, bandages, decorative and protective sheets (such as shelf and drawer liners), floor tiles, sanitary napkin/incontinence device placement strips, sun control films, the joining of gaskets to automobile windows, packaging, bookbinding, construction of nonwoven articles, and insulation bonding.

25 Claims, No Drawings

U.S. PATENT DOCUMENTS 6,723,810 B2   4/2004   Finlayson et al.

FOREIGN PATENT DOCUMENTS

| EP | 416815 | 3/1991 |
| EP | 0 442 045 A2 | 8/1991 |
| EP | 0 608 175 A1 | 7/1994 |
| JP | S61(1986)-236804 | 10/1986 |
| JP | S62(1987)-129303 | 6/1988 |
| WO | 92/12212 | 7/1992 |
| WO | WO-1993/11184 | 6/1993 |
| WO | 94/00500 A1 | 1/1994 |
| WO | 94/10256 | 5/1994 |
| WO | WO 97/15636 | 5/1997 |

OTHER PUBLICATIONS

Hawley's Condensed Chemical Dictionary, 12$^{th}$ ed., Lewes ed., Van Nostrand Reinhold Co. New York, p. 806 (1993).

International Search report dated Nov. 6, 1997 issued by the EPO acting as the International Searching Authority in PCT US97/12366.

Tse, "Application of Adhesion Model for Developing Hot Melt Adhesives, Bonded to Polyolefin Surfaces", Journal of Adhesion, vol. 48, Issue 1-4, pp. 149-167 (1995).

\* cited by examiner

ADHESIVES COMPRISING OLEFIN POLYMERS

REFERENCE TO RELATED APPLICATIONS

This application is a U.S. National Stage application, under 35 U.S.C. § 371, of International Application No. PCT/US97/04161, filed on Mar. 14, 1997, which is a continuation of U.S. application Ser. No. 08/615,750, filed on Mar. 14, 1996, now abandoned, and a continuation of U.S. application Ser. No. 08/616,406, filed Mar. 14, 1996, now abandoned.

The subject invention relates to hot melt adhesives comprising at least one homogeneous linear or substantially linear interpolymer of ethylene with at least one $C_3$–$C_{20}$ α-olefin, further characterized by each said interpolymer having a polydispersity less than about 2.5, and articles constructed therefrom. Such hot melt adhesives are useful in a variety of applications including but not limited to bookbinding, case and carton seal, packaging, glue sticks, foam in place gaskets, and particularly pressure sensitive adhesives for tag and label adhesives, palletizing adhesives, skin attachment adhesives, positioning adhesives, diaper tapes and construction adhesives for assembly of nonwoven articles, etc.

Historically, adhesives have been based on any of five polymer classes: polyethylene; ethylene vinyl acetate; natural rubber or block copolymer elastomers (for example, styrene-isoprene-styrene block copolymers, styrene-butadiene-styrene block copolymers, and styrene-butadiene random copolymers); acrylics (such as interpolymers of butyl acrylate, 2-ethyl hexyl acrylate, and methyl methacrylate); and amorphous polyolefins, and the like, amorphous $C_3$ and greater α-olefins, such as atactic polypropylene, copolymers of propylene and higher order α-olefins, and polybutene.

Linear low density polyethylene and low density polyethylene have been used as a base polymer in a variety of hot melt adhesives, particularly for case and carton sealing, wherein upon cooling and solidifying the resulting adhesive is relatively tack free. Polyethylene waxes are also used in formulating hot melt adhesives. Linear low density polyethylene and low density polyethylene, as base raw materials for adhesives, suffer from the disadvantage that due to their crystalline nature, they tend to be very stiff and have poor cold temperature properties. In addition to poor cold temperature properties, polyethylene case and carton seal adhesives have limited hot tack, resulting in low peel adhesion failure temperatures. Further, polyethylene has had limited utility as a base polymer in formulating pressure sensitive adhesives, particularly due to poor oil holding capability.

Ethylene vinyl acetate (EVA) based systems are limited in that as higher vinyl acetate levels are selected, although crystallinity decreases and elastomeric performance increase, compatibility with formulation ingredients decreases. Accordingly, EVA is typically utilized in non-pressure sensitive adhesive applications.

Block copolymer elastomers provide an excellent balance of tack, peel resistance and creep resistance properties. Such elastomers may be utilized in solvent-based, water-born, and hot melt pressure sensitive adhesives. However, adhesive systems based on such elastomers are disadvantageous in that the sites of unsaturation in the block copolymer backbone make the adhesive susceptible to degradation by the action of oxygen and ultraviolet light.

Acrylic systems, while stable to oxygen and ultraviolet light, are inferior to block copolymer elastomer systems in terms of the balance of tack, peel and creep resistance. Further, such systems are typically available only in the solvent-based and water-borne systems, making them further disadvantageous for the reasons set forth above.

Amorphous polyolefins have been utilized in adhesive systems, at least in part to provide improved stability to oxygen and ultraviolet light, as compared to block copolymer elastomer systems. Due to the fact that amorphous polyolefins have been historically available as reaction by-products, they have been inconsistent in grade, composition, and viscosity, leading to a poor balance of properties. In particular, poly-1-butene has a tendency to slowly crystallize after application to the substrate, leading to a profound loss of tack. When oil is added to increase tack, the oil tends to migrate out of the adhesive into the backing layer or the substrate. Due to the heterogenity of branch distribution and broad molecular weight distribution, adhesives comprising less than 40 weight percent amorphous polyolefins tend to be weak cohesively, suffer from low tensile strength, and leave a residue on the substrate surface after peeling. To compensate for their inherent poor cohesive strength, adhesives based on amorphous polyolefins tend to have a high concentration of amorphous polyolefin, resulting in a relatively high viscosity. Such high viscosity renders amorphous polyolefin-based adhesives unsuitable for use with spray application equipment at typical application temperatures of less than about 325° F. (167° C.). Amorphous polyolefins further disadvantageously tend to have unpredictable aging characteristics due to an uncontrolled secondary crystallization caused by the random chain length and distribution of the comonomer branching.

Homogeneous linear and substantially linear ethylene polymers prepared using single-site or metallocene catalysts have been recently introduced. Homogeneous ethylene polymers are characterized as having a narrow molecular weight distribution and a uniform short-chain branching distribution. In the case of substantially linear ethylene polymers, such homogeneous ethylene polymers are further characterized as having long chain branching. Substantially linear ethylene polymers are commercially available from The Dow Chemical Company as Affinity™ polyolefin plastomers, which are produced using Dow's Insite™ technology. Homogeneous linear ethylene polymers are available from Exxon Chemical Company under the trade name Exact® plastomers.

Tse et al., U.S. Pat. No. 5,530,054, claims a hot melt adhesive composition consisting essentially of: (a) 30–70 weight percent of a copolymer of ethylene and about 6 to about 30 weight percent of a $C_4$ to $C_{20}$ α-olefin produced in the presence of a catalyst composition comprising a metallocene and an alumoxane and having an $M_w$ of from about 20,000 to about 100,000; and (b) a hydrocarbon tackifier which is selected from a recited list. Exemplified are compositions consisting of 45 weight percent of ethylene/butene-1 copolymer having a specific gravity of either 0.898 g/cm³ or 0.901 g/cm³.

Tse et al, U.S. Pat. No. 5,548,014, claims a hot melt adhesive composition comprising a blend of ethylene/α-olefin copolymers wherein the first copolymer has a $M_w$ from about 20,000 to about 39,000 and the second copolymer has a $M_w$ from about 40,000 to about 100,000. Each of the hot melt adhesives exemplified comprises a blend of copolymers, contains 45 weight percent copolymer, with at least one of the copolymers having a polydispersity greater than 2.5. Furthermore, the lowest density copolymer exemplified has a specific gravity of 0.894 g/cm³.

However, Tse, in Application of Adhesion Model for Developing Hot Melt Adhesives Bonded to Polyolefin Surfaces, Journal of Adhesion, Vol. 48, Issue 1–4, pp. 149 to 167 (1995), notes that compared with hot melt adhesives based on ethylene/vinyl acetate copolymer, hot melt adhesives based on homogeneous linear ethylene/α-olefin interpolymers show higher viscosity and inferior tensile strength, but better bond strength to polyolefin surfaces, higher strain at break and lower yield stress.

Lakshmanan et al., U.S. Pat. No. 5,397,843, teaches blended polymer compositions comprising an admixture of a copolymer of ethylene and an α-olefin and an amorphous polypropylene and/or amorphous polyolefin, or mixtures thereof. A hot melt adhesive is claimed comprising from 20 to 97.5 percent of a traditional polyolefin. The examples set forth in Lakshmanan teach compositions with high concentrations, at least 42.5 percent by weight, of blended polymers and tend to suffer from the previously described disadvantages of traditional polyolefins. The single ethylene and α-olefin exemplified is "Flexomer 9042" from Union Carbide, having a 1-butene content of 15 weight percent, a melt index of 5.0 g/10 minute, a crystallinity level of 26 percent and a density of 0.900 g/cm$^3$. The "Flexomer" polyolefin from Union Carbide depicted in the examples is believed to have a polydispersity greater than 2.5.

Those in industry would find great advantage in hot melt adhesives based on homogeneous ethylene/α-olefin interpolymers which have a balance of properties which is superior to those which have been previously attained.

Accordingly, the subject invention pertains to an adhesive comprising:
(a) from 5 to 95 weight percent of at least one interpolymer which is a homogeneous linear or substantially linear ethylene/α-olefin interpolymer characterized as having a density from 0.850 to 0.885 g/cm$^3$;
(b) from 0 to 95 weight percent of at least one tackifier;
(c) from 0 to about 90 weight percent of at least one plasticizer; and
(d) from 0 to 90 weight percent of at least one wax; wherein the sum of components (b), (c), and (d) comprises 5 to 95 weight percent of said adhesive composition.

The subject invention further pertains to a hot melt adhesive composition comprising:
(a) a homogeneous linear interpolymer of ethylene and greater than 30 weight percent as determined by mass balance, based on the total weight of ethylene and comonomer, of an α-olefin comonomer having from 3 to 20 carbon atoms, which copolymer has a weight average molecular weight ($M_w$) of from 2000 to 100,000; and
(b) a tackifier.

The subject invention further pertains to an adhesive comprising:
(a) from 5 to 95 weight percent of at least one interpolymer which is a homogeneous linear or substantially linear ethylene/α-olefin interpolymer characterized as having a weight average molecular weight ($M_w$) of less than 20,000;
(b) from 0 to 95 weight percent of at least one tackifier;
(c) from 0 to about 90 weight percent of at least one plasticizer; and
(d) from 0 to 90 weight percent of at least one wax;

wherein the sum of components (b), (c), and (d) comprises 5 to 95 weight percent of said adhesive composition.

The subject invention further provides various adhesive compositions which are targeted for use in various adhesive applications. In this regard, the subject invention further pertains to a hot melt adhesive comprising:
(a) from 30 to 97 weight percent of at least one first polymer which is an interpolymer of ethylene and at least one $C_3$–$C_{20}$ α-olefin, said at least one first polymer being characterized as having:
  (i) a density of from 0.850 to 0.885 g/cm$^3$,
  (iii) a number average molecular weight as determined by gel permeation chromatography, of less than 20,000;
(b) from 3 to 70 weight percent of at least one second polymer which is an ethylene homopolymer or an interpolymer of ethylene with at least $C_3$–$C_{20}$ α-olefin, the at least one second polymer being characterized as having:
  (i) a density of from 0.910 to 0.970 g/cm$^3$,
  (ii) a number average molecular weight as determined by gel permeation chromatography, of less than 6,000; and
(c) from 0 to 70 weight percent of one or more tackifiers.

In one preferred embodiment, the adhesive compositions of the present invention are pressure sensitive adhesives, which are characterized as having a storage modulus (G') at 25° C. of less than 1×10$^7$ dynes/cm$^2$ (1 MPa) and a glass transition temperature ($T_g$) of from −65° C. to 30° C., more preferably from 0° C. to 20° C. and most preferably from 10° C. to 20° C.

Optionally, the adhesive composition of the invention may further contain an additional polymer selected from the group consisting of compatible elastomers, such as a thermoplastic block copolymer, polyamides, amorphous or crystalline polyolefins such as polypropylene, polybutylene or polyethylene, wherein $M_w$ is greater than about 3000; interpolymers or ionomers of ethylene with at least one comonomer selected from the group consisting of vinyl esters of a saturated carboxylic acid having up to 4 carbon atoms, unsaturated mono- or dicarboxylic acids of 3 to 5 carbon atoms, or salts or esters thereof; and mixtures thereof.

In one embodiment, the invention provides hot melt adhesives comprising homogeneous ethylene polymers in conjunction with low density polyethylene or heterogeneously branched linear low density polyethylene having a weight average molecular weight ($M_w$) greater than about 3000, ethylene-vinyl acetate (EVA), or a polyamide.

Optionally, the at least one ethylene/α-olefin interpolymer utilized in the hot melt adhesives of the invention may be provided in conjunction with a second homogeneous linear or substantially linear interpolymer, which differs in at least one physical property selected from the group consisting of density, comonomer type, number average molecular weight and combinations thereof. The interpolymers may be blended at ratios ranging from 0.05 to 20 ratio by weight to 20 to 0.05 ratio by weight.

In a preferred embodiment, a first homogeneous ethylene/α-olefin interpolymer having a density less than 0.870 g/cm$^3$ is provided in conjunction with a second homogeneous ethylene/α-olefin interpolymer having a density greater than 0.900 g/cm$^3$.

In one particularly preferred embodiment, the subject invention provides a hot melt adhesive comprising:
(a) from 5–95 weight percent of a polymer mixture which in turn comprises:
  (i) from 30 to 97 weight percent of at least one first polymer which is an interpolymer of ethylene and at least one $C_3$–$C_{20}$ α-olefin, the at least one first polymer being characterized as having a density of from 0.850 to 0.920 g/cm$^3$, and a number average molecular weight as determined by gel permeation chromatography, of less than 80,000; and (ii) from 3 to 70 weight percent of at least one second polymer which is an ethylene homopolymer or an interpolymer of ethylene and at least one $C_3$–$C_{20}$ α-olefin, the at least one second polymer being characterized as having a density of from 0.910 to 0.970 g/cm$^3$ and a number average molecular weight as determined by gel permeation chromatography, of less than 6,000; and (b) from 0 to 95 weight percent of at least one tackifier;
(c) from 0 to about 90 weight percent of at least one plasticizer; and
(d) from 0 to 90 weight percent of at least one wax;

wherein the density of the at least one first polymer and the at least one second polymer differ by at least 0.01 g/cm$^3$ and the number average molecular weights of the at least one first polymer and the at least one second polymer differ by at least 5000.

The subject invention further provides a polymerization process comprising:

(a) reacting by contacting ethylene and at least one $C_3$–$C_{20}$ α-olefin, under solution polymerization conditions, in the presence of a single site catalyst composition, in at least one reactor, to produce a solution of a first polymer which is an interpolymer of ethylene and the at least one $C_3$–$C_{20}$ α-olefin, the at least one first polymer being characterized as having:
  (i) a density of from 0.850 to 0.920 g/cm$^3$,
  (ii) a number average molecular weight as determined by gel permeation chromatography, of from 5,000 to 80,000; and
  (iii) a molecular weight distribution ($M_w/M_n$) of from 1.5 to 2.5;

(b) reacting by contacting ethylene and, optionally, at least one $C_3$–$C_{20}$ α-olefin, under solution polymerization conditions, in the presence of a single site catalyst composition or a heterogeneous catalyst composition, in at least one other reactor, to produce a solution of at least one second polymer, which is an ethylene homopolymer or an interpolymer of ethylene with the at least one $C_3$–$C_{20}$ α-olefin, the at least one second polymer being characterized as having:
  (i) a density of from 0.910 to 0.970 g/cm$^3$,
  (ii) a number average molecular weight as determined by gel permeation chromatography, of less than 6,000, and
  (iii) a molecular weight distribution ($M_w/M_n$) of from 1.5 to 2.5;

(c) combining the solution of the first reactor with the solution of the second reactor to form a solution of a blend;
(d) removing the solvent from the solution of a blend of step
(c) and recovering the blend; and
(e) optionally introducing a tackifier into the reactor of step (a), the reactor of step (b), or at any point subsequent to the reacting of step (b).

In general, the adhesive composition of the present invention exhibits improved properties, including excellent viscosity and color stability, particularly at elevated temperatures; high cohesive strength and excellent oil holding power, allowing the use of relatively low concentrations of the employed homogeneous linear or substantially linear interpolymers; compatibility with a wide range of other polymers, tackifiers, and plasticizers, particularly waxes; and improved adhesion to polyolefin substrates such as polyolefin based containers and films. The adhesive composition of the present invention is also surmised to be repulpable and be able to be used at lower coating weights due to its low density, as well as be resistant to degradation caused by exposure to ultraviolet radiation.

The adhesive of the present invention is useful for a variety of articles such as tapes, labels, disposables, including disposable diapers and feminine napkins, as well as for bookbinding, packaging, and skin attachment adhesives for medical tapes and devices. Improved adhesion to films such as low density polyethylene (LDPE), high density polyethylene (HDPE), shrink wrap and particularly films prepared from homogeneous ethylene polymers, in combination with good spray properties, allows the adhesive compositions of the present invention to be particularly useful for the nonwoven industry in the manufacture of disposable diapers, feminine napkins, and surgical drapes.

In another preferred embodiment, homogeneous ethylene polymers have further been found to be useful alone or in combination with other ingredients such as tackifiers and waxes as a coextrusion coating or a thermoplastic packaging film which is meltable and blendable with the adhesive composition, such as a batch inclusion bag. This aspect is particularly advantageous when the polymer of the adhesive composition, the coextrusion coating, and/or the thermoplastic packaging film are of the same polymer chemistry, insuring mutual compatibility.

These and other embodiments are more fully described in the following detailed description.

The adhesives of the invention comprise at least one homogeneous ethylene/α-olefin interpolymer which is an interpolymer of ethylene and at least one $C_3$–$C_{20}$ α-olefin. The term "interpolymer" is used herein to indicate a copolymer, or a terpolymer, or a higher order polymer. That is, at least one other comonomer is polymerized with ethylene to make the interpolymer.

The homogeneous ethylene/α-olefin interpolymer is a homogeneous linear or substantially linear ethylene/α-olefin interpolymer. By the term "homogenous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases. However, unlike heterogeneous polymers, when a homogeneous polymer has a melting peak greater than 115° C. (such as is the case of polymers having a density greater than 0.940 g/cm$^3$), it does not additionally have a distinct lower temperature melting peak.

In addition or in the alternative, the homogeneity of the polymer may be described by the SCBDI (Short Chain Branching Distribution Index) or CDBI (Composition Distribution Breadth Index), which are defined as the weight percent of the polymer molecules having a conomomer content within 50 percent of the median total molar comonomer content. The SCBDI of a polymer is readily calculated from data obtained from techniques known in the art, such as, for example, temperature rising elution fractionation (abbreviated herein as "TREF"), which is described, for example, in Wild et al., Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.).

The SCBDI or CDBI for the homogeneous ethylene/α-olefin interpolymers useful in the invention is preferably greater than 50 percent, more preferably greater than 70 percent, with SCBDI's and CDBI of greater than 90 percent being easily attained.

The homogeneous ethylene/α-olefin interpolymers useful in the invention are characterized as having a narrow molecular weight distribution ($M_w/M_n$). For the homogeneous ethylene/α-olefins useful in the adhesives of the invention, the $M_w/M_n$ is from 1.5 to 2.5, preferably from 1.8 to 2.2, most preferably about 2.0.

Substantially linear ethylene interpolymers are homogeneous interpolymers having long chain branching. Due to the presence of such long chain branching, substantially linear ethylene interpolymers are further characterized as having a melt flow ratio ($I_{10}/I_2$) which may be varied independently of the polydispersity index, and the like, the molecular weight distribution $M_w/M_n$. This feature accords substantially linear ethylene polymers with a high degree of processability despite a narrow molecular weight distribution.

It is noted that substantially linear interpolymers useful in the invention differ from low density polyethylene prepared in a high pressure process. In one regard, whereas low density polyethylene is an ethylene homopolymer having a density of from 0.900 to 0.935 g/cm³, the homogeneous linear and substantially linear interpolymers useful in the invention require the presence of a comonomer to reduce the density to the range of from 0.900 to 0.935 g/cm³.

The long chain branches of substantially linear ethylene interpolymers have the same comonomer distribution as the interpolymer backbone and can be as long as about the same length as the length of the interpolymer backbone. When a substantially linear ethylene/α-olefin interpolymer is employed in the practice of the invention, such interpolymer will be characterized as having an interpolymer backbone substituted with from 0.01 to 3 long chain branches per 1000 carbons.

Methods for determining the amount of long chain branching present, both qualitatively and quantitatively, are known in the art.

For qualitative methods for determining the presence of long chain branching, see, for example, U.S. Pat. Nos. 5,272,236 and 5,278,272. As set forth therein, a gas extrusion rheometer (GER) may be used to determine the rheological processing index (PI), the critical shear rate at the onset of surface melt fracture, and the critical shear stress at the onset of gross melt fracture, which in turn indicate the presence or absence of long chain branching as set forth below.

The gas extrusion rheometer useful in the determination of rheological processing index (PI), the critical shear rate at the onset of surface melt fracture, and the critical shear stress at the onset of gross melt fracture, is described by M. Shida, R. N. Shroff, and L. V. Cancio in Polymer Engineering Science, Vol. 17, No. 11, p. 770 (1977), and in "Rheometers for Molten Plastics" by John Dealy, published by Van Nostrand Reinhold co. (1982) on pp. 97–99. GER experiments are performed at a temperature of 190° C., at nitrogen pressures between 250 and 5500 psig (between 1.72 and 37.9 MPa) using a 0.0754 mm diameter, 20:1 L/D die with an entrance angle of 180°.

For substantially linear ethylene interpolymers, the PI is the apparent viscosity (in kpoise) of a material measured by GER at an apparent shear stress of 2.15×10⁶ dynes/cm² (0.215 MPa). Substantially linear ethylene interpolymers useful in the invention will have a PI in the range of 0.01 kpoise to 50 kpoise, preferably 15 kpoise or less. Substantially linear ethylene interpolymers have a PI which is less than or equal to 70 percent of the PI of a linear ethylene interpolymer (either a Ziegler polymerized polymer or a homogeneous linear ethylene interpolymer) having the same comonomer or comonomers, and having an $I_2$, $M_w/M_n$, and density, each of which is within 10 percent of that of the substantially linear ethylene interpolymer.

An apparent shear stress versus apparent shear rate plot may be used to identify the melt fracture phenomena and to quantify the critical shear rate and critical shear stress of ethylene polymers. According to Ramamurthy, in the Journal of Rheology, 30(2), 1986, pp. 337–357, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharksin." Herein, as determined using the above-described gas extrusion rheometer, the onset of surface melt fracture is characterized as the beginning of losing extrudate gloss at which the surface roughness of the extrudate can only be detected by magnification at 40 times. The critical shear rate at the onset of surface melt fracture for a substantially linear ethylene interpolymer is at least 50 percent greater than the critical shear rate at the onset of surface melt fracture for a linear ethylene polymer having the same comonomer or comonomers and having an $I_2$, $M_w/M_n$ and density within ten percent of that of the substantially linear ethylene polymer.

Gross melt fracture occurs at unsteady extrusion flow conditions and ranges from regular (alternating rough and smooth, helical, etc.) to random distortions. The critical shear stress at the onset of gross melt fracture of substantially linear ethylene interpolymers, especially those having a density greater than 0.910 g/cm³, is greater than 4×10⁶ dynes/cm² (0.4 MPa).

The presence of long chain branching may further be qualitatively determined by the Dow Rheology Index (DRI), which expresses a polymer's "normalized relaxation time as the result of long chain branching." (See, S. Lai and G. W. Knight, ANTEC '93 Proceedings, INSITE™ Technology Polyolefins (SLEP)—New Rules in the Structure/Rheology Relationship of Ethylene α-Olefin Copolymers, New Orleans, La., May 1993. DRI values range from 0 for polymers which do not have any measurable long chain branching, such as Tafmer™ products available from Mitsui Petrochemical Industries and Exact™ products available from Exxon Chemical company) to about 15, and are independent of melt index. In general, for low to medium pressure ethylene polymers, particular at lower densities, DRI provides improved correlations to melt elasticity and high shear flowability relative to correlations of the same attempted with melt flow ratios. Substantially linear ethylene interpolymers will have a DRI of preferably at least 0.1, more preferably at least 0.5, and most preferably at least 0.8.

DRI may be calculated from the equation:

$$DRI = (3.652879 * \tau_o^{1.00649} / \eta_o - 1)/10$$

where $\tau_o$ is the characteristic relaxation time of the interpolymer and $\eta_o$ is the zero shear viscosity of the interpolymer. Both $\tau_o$ and $\eta_o$ are the "best fit" values to the Cross equation, and the like, $$\eta/\eta_o = 1/(1+(\gamma*\tau_o)^{1-n})$$

in which n is the power law index of the material, and η and γ are the measured viscosity and shear rate, respectively.

Baseline determination of viscosity and shear rate data are obtained using a Rheometric Mechanical Spectrometer (RMS-800) under dynamic sweep mode from 0.1 to 100 radians/second at 160° C. and a gas extrusion rheometer (GER) at extrusion pressures from 1,000 to 5,000 psi (6.89 to 34.5 MPa), which corresponds a shear stress of from 0.086 to 0.43 MPa, using a 0.0754 mm diameter, 20:1 L/D die at 190° C. Specific material determinations may be performed from 140 to 190° C. as required to accommodate melt index variations.

For quantitative methods for determining the presence of long chain branching, see, for example, U.S. Pat. Nos. 5,272,236 and 5,278,272; Randall (Rev. Macromol. Chem. Phys., C29 (2&3), p. 285–297), which discusses the measurement of long chain branching using $^{13}C$ nuclear magnetic resonance spectroscopy, Zimm, G. H. and Stockmayer, W. H., J. Chem. Phys., 17, 1301 (1949); and Rudin, A., Modern Methods of Polymer Characterization, John Wiley & Sons, New York (1991) pp. 103–112, which discuss the use of gel permeation chromatography coupled with a low angle laser light scattering detector (GPC-LALLS) and gel permeation chromatography coupled with a differential viscometer detector (GPC-DV).

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in substantially linear ethylene polymers. In particular, deGroot and Chum found that the presence of long chain branches in substantially linear ethylene polymers correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of log($I_2$, melt index) as a function of log(GPC weight average molecular weight), as determined by GPC-DV, illustrates that the long chain branching aspects (but not the extent of long chain branching) of substantially linear ethylene polymers are comparable to those of high pressure, highly branched low density polyethylene (LDPE) and are clearly distinct from heterogeneously branched ethylene polymers produced using Ziegler-type catalysts (such as linear low density polyethylene and ultra low density polyethylene) as well as from homogeneous linear ethylene polymers (such as Tafmer™ products available from Mitsui Petrochemical Industries and Exact™ products available from Exxon Chemical Company).

The first polymer will be an interpolymer of ethylene with at least one comonomer selected from the group consisting of $C_3$–$C_{20}$ α-olefins, non-conjugated dienes, and cycloalkenes. Exemplary $C_3$–$C_{20}$ α-olefins include propylene, isobutylene, 1-butene, 1-hexene, 4-methyl-1-pentene, 1-heptene, and 1-octene. Preferred $C_3$–$C_{20}$ α-olefins include 1-butene, 1-hexene, 4-methyl-1-pentene, 1-heptene, and 1-octene, more preferably 1-hexene and 1-octene. Exemplary cycloalkenes include cyclopentene, cyclohexene, and cyclooctene. The non-conjugated dienes suitable as comonomers, particularly in the making of ethylene/α-olefin/diene terpolymers, are typically non-conjugated dienes having from 6 to 15 carbon atoms. Representative examples of suitable non-conjugated dienes include:

(a) Straight chain acyclic dienes such as 1,4-hexadiene; 1,5-heptadiene; and 1,6-octadiene;

(b) Branched chain acyclic dienes such as 5-methyl-1,4-hexadiene; 3,7-dimethyl-1,6-octadiene; and 3,7-dimethyl-1,7-octadiene;

(c) Single ring alicyclic dienes such as 4-vinylcyclohexene; 1-allyl-4-isopropylidene cyclohexane; 3-allylcyclopentene; 4-allylcyclohexene; and 1-isopropenyl-4-butenylcyclohexene;

(d) Multi-ring alicyclic fused and bridged ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; and 5-cyclohexylidene-2-norbornene.

One preferred conjugated diene is piperylene. The preferred dienes are selected from the group consisting of 1,4-hexadiene; dicyclopentadiene; 5-ethylidene-2-norbornene; 5-methylene-2-norbornene; 7-methyl-1,6 octadiene; piperylene; and 4-vinylcyclohexene.

The molecular weight of the ethylene/α-olefin interpolymer will be selected on the basis of the desired performance attributes of the adhesive formulation. Typically, however, the ethylene/α-olefin interpolymer will preferably have a number average molecular weight of at least 3,000, preferably at least 5,000. Typically, the ethylene/α-olefin interpolymer will preferably have a number average molecular weight of no more than 100,000, more preferably no more than 60,000, and even more preferably less than 40,000.

When the ethylene/α-olefin interpolymer has an ultra-low molecular weight, and the like, a number average molecular weight less than 11,000, the ethylene/α-olefin interpolymer leads to a low polymer and formulation viscosity but is characterized by a peak crystallization temperature which is greater than that of corresponding higher molecular weight materials of the same density. In pressure sensitive adhesive applications, the increase in peak crystallization temperature translates to an increased heat resistance. Ultra-low molecular weight ethylene/α-olefin interpolymers are more fully described below.

The density of the ethylene/α-olefin interpolymer will likewise be selected on the basis of the desired performance attributes of the adhesive formulation. Typically, however, the ethylene/α-olefin interpolymer will have a density of at least 0.850 g/cm$^3$, preferably at least 0.860, and more preferably at least 0.870 g/cm$^3$. Typically, the ethylene/α-olefin interpolymer will have a density of no more than 0.965 g/cm$^3$, preferably no more than 0.900 g/cm$^3$, more preferably no more than 0.890 g/cm$^3$, and even more preferably no more than 0.880 g/cm$^3$, and most preferably no more than 0.875 g/cm$^3$.

The ethylene/α-olefin interpolymer will be present in the adhesives of the invention in an amount greater than 5, and preferably greater than 10 weight percent. The ethylene/α-olefin interpolymer will typically be present in the adhesive of the invention in an amount of not more than 95, preferably not more than 80, and more preferably not more than 70 weight percent.

The adhesive may comprise a single homogeneous ethylene/α-olefin interpolymer. In such an embodiment, the homogeneous ethylene/α-olefin interpolymer will preferably have a density ranging from 0.865 g/cm³ to 0.885 g/cm³. When it is desired to prepare an adhesive formulation with a minimal concentration of the homogeneous linear or substantially linear interpolymer, and the like, adhesive formulations containing less than 30 weight percent, preferably less than 25 weight percent of the homogeneous ethylene/α-olefin interpolymer, the melt index ($I_2$ at 190° C.) of the homogeneous linear or substantially linear interpolymer will be preferably 50 or less, more preferably 30 or less, and most preferably less than 10 g/10 min. It is believed that adhesive compositions comprising as little as 5 weight percent of the homogeneous ethylene/α-olefin interpolymer having a melt index less than 0.5 g/10 min. would yield an advantageous performance.

In the case of pressure sensitive adhesives, preferred adhesives will comprise from 5 to 45 weight percent, preferably from 10 to 30, more preferably from 15 to 25 weight percent of a single homogeneous ethylene/alpha-olefin interpolymer. For other applications, for example packaging, the homogeneous linear or substantially linear interpolymer will preferably be employed at concentrations greater than 30 weight percent and have a melt index of 500 g/10 min or less.

In another embodiment, the first homogeneous ethylene/α-olefin interpolymer may be blended with a second homogeneous ethylene/α-olefin interpolymer, wherein the first and second interpolymers differ in number average molecular weight by at least 5000, preferably at least 10,000, and more preferably at least 20,000. In this embodiment, the combination of the lower molecular weight and higher molecular weight components will tend to yield an intermediate storage modulus at 25° C. and an improved probe tack.

In addition or in the alternative, the first homogeneous ethylene/α-olefin interpolymer may be blended with a second homogeneous ethylene/α-olefin interpolymer, wherein the first and second interpolymers differ in density by at least 0.005 g/cm³, preferably by at least 0.01 g/cm³. In this embodiment, particularly in the case of pressure sensitive adhesives, as the density differential increases, the relative proportion of the higher density interpolymer will typically decrease, as the increased levels of crystallinity would otherwise tend to decrease storage modulus at 25° C. and probe tack to levels which would render them unsuitable for use as pressure sensitive adhesives.

In one preferred embodiment, the adhesive will comprise a blend of two homogeneous ethylene/α-olefin, wherein the first interpolymer having a density of 0.870 g/cm³ or less and the second interpolymer having density greater than 0.900 g/cm³. When high cohesive strength is desired, the first and second homogeneous linear or substantially linear interpolymer, will preferably both have relatively low melt indices, and the like, an $I_2$ of less than 30 g/10 min. In contrast, for lower viscosity adhesive compositions, especially those which are sprayable at temperatures less than 325° F. (163° C.), the second homogeneous ethylene/α-olefin interpolymer will have a greater density than the first homogeneous ethylene/α-olefin interpolymer, and will preferably have a melt index greater than 125, more preferably greater than 500, and most preferably greater than 1000 g/10 min.

Homogeneously branched linear ethylene/α-olefin interpolymers may be prepared using polymerization processes (for example, as described by Elston in U.S. Pat. No. 3,645,992) which provide a homogeneous short chain branching distribution. In his polymerization process, Elston uses soluble vanadium catalyst systems to make such polymers. However, others such as Mitsui Petrochemical Company and Exxon Chemical Company have used so-called single site catalyst systems to make polymers having a homogeneous linear structure. U.S. Pat. No. 4,937,299 to Ewen et al. and U.S. Pat. No. 5,218,071, to Tsutsui et al. disclose the use of catalyst systems based on hafnium for the preparation of homogeneous linear ethylene polymers. Homogeneous linear ethylene/α-olefin interpolymers are currently available from Mitsui Petrochemical Company under the trade name "Tafmer" and from Exxon Chemical Company under the trade name "Exact".

Substantially linear ethylene/α-olefin interpolymers are available from The Dow Chemical Company as Affinity™ polyolefin plastomers and Engage™ polyolefin elastomers. Substantially linear ethylene/α-olefin interpolymers may be prepared in accordance with the techniques described in U.S. Pat. No. 5,272,236 and in U.S. Pat. No. 5,278,272.

Ultra-low molecular weight polymers may be made in accordance with the Examples herein and with the procedures set forth below.

The first polymer may be suitably prepared using a constrained geometry metal complex, such as are disclosed in U.S. application Ser. No. 07/545,403, filed Jul. 3, 1990 (EP-A-416,815); U.S. application Ser. No. 07/702,475, filed May 20, 1991 (EP-A-514,828); as well as U.S. Pat. Nos. 5,470,993, 5,374,696, 5,231,106, 5,055,438, 5,057,475, 5,096,867, 5,064,802, and 5,132,380. In U.S. Ser. No. 07/720,041, filed Jun. 24, 1991, (EP-A-514,828) certain borane derivatives of the foregoing constrained geometry catalysts are disclosed and a method for their preparation taught and claimed. In U.S. Pat. No. 5,453,410 combinations of cationic constrained geometry catalysts with an alumoxane were disclosed as suitable olefin polymerization catalysts.

Suitable activating cocatalysts and activating techniques have been previously taught with respect to different metal complexes in the following references: EP-A-277,003, U.S. Pat. No. 5,153,157, U.S. Pat. No. 5,064,802, EP-A468,651 (equivalent to U.S. Ser. No. 07/547,718), EP-A-520,732 (equivalent to U.S. Ser. No. 07/876,268), WO 95/00683 (equivalent to U.S. Ser. No. 08/82,201), and EP-A-520,732 (equivalent to U.S. Ser. No. 07/884,966 filed May 1, 1992.

Catalysts found to be particularly suitable in the preparation of substantially linear ethylene/α-olefin interpolymers include, for instance, the catalysts described in the Examples set forth below, as activated by trispentafluorophenylborane and triisobutylaluminum modified methylalumoxane cocatalysts.

The molar ratio of metal complex: activating cocatalyst employed preferably ranges from 1:1000 to 2:1, more preferably from 1:5 to 1.5:1, most preferably from 1:2 to 1:1. In the preferred case in which a metal complex is activated by trispentafluorophenylborane and triisobutylaluminum modified methylalumoxane, the titanium:boron:aluminum molar ratio is typically from 1:10:50 to 1:0.5:0.1, most typically from about 1:3:5.

A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal):support from 1:100,000 to 1:10, more preferably from 1:50,000 to 1:20, and most preferably from 1:10,000 to 1:30. In most polymerization reactions the molar ratio of catalyst:polymerizable compounds employed is from $10^{-12}$:1 to $10^{-1}$:1, more preferably from $10^{-9}$:1 to $10^{-5}$:1.

At all times, the individual ingredients as well as the recoved catalyst components must be protected from oxygen and moisture. Therefore, the catalyst components and catalysts must be prepared and recovered in an oxygen and moisture free atmosphere. Preferably, therefore, the reactions are performed in the presence of a dry, inert gas such as, for example, nitrogen.

The polymerization may be carried out as a batchwise or a continuous polymerization process, with continuous polymerizations processes being required for the preparation of substantially linear polymers. In a continuous process, ethylene, comonomer, and optionally solvent and diene are continuously supplied to the reaction zone and polymer product continuously removed therefrom.

In general, the first polymer may be polymerized at conditions for Ziegler-Natta or Kaminsky-Sinn type polymerization reactions, that is, reactor pressures ranging from atmospheric to 3500 atmospheres. The reactor temperature should be greater than 80° C., typically from 100° C. to 250° C., and preferably from 100° C. to 150° C., with temperatures at the higher end of the range, and the like, temperatures greater than 100° C. favoring the formation of lower molecular weight polymers.

In conjunction with the reactor temperature, the hydrogen:ethylene molar ratio influences the molecular weight of the polymer, with greater hydrogen levels leading to lower molecular weight polymers. When the desired polymer has an $I_2$ of 1 g/10 min, the hydrogen:ethylene molar ratio will typically be 0:1. When the desired polymer has an $I_2$ of 1000 g/10 min., the hydrogen:ethylene molar ratio will typically be from 0.45:1 to 0.7:1. The upper limit of the hydrogen:ethylene molar ratio is from 2.2 to 2.5:1.

Generally the polymerization process is carried out with a differential pressure of ethylene of from 10 to 1000 psi (70 to 7000 kPa), most preferably from 40 to 60 psi (30 to 300 kPa). The polymerization is generally conducted at a temperature of from 80 to 250° C., preferably from 90 to 170° C., and most preferably from greater than 95° C. to 140° C.

In most polymerization reactions the molar ratio of catalyst:polymerizable compounds employed is from $10^{12}$:1 to $10^{-1}$:1, more preferably from $10^{-9}$:1 to $10^{-5}$:1. Solution polymerization conditions utilize a solvent for the respective components of the reaction. Preferred solvents include mineral oils and the various hydrocarbons which are liquid at reaction temperatures. Illustrative examples of useful solvents include alkanes such as pentane, iso-pentane, hexane, heptane, octane and nonane, as well as mixtures of alkanes including kerosene and Isopar-E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) will typically be from 2.5:1 to 12:1, beyond which point catalyst efficiency suffers. The most typical solvent:ethylene ratio (weight basis) is in the range of from 5:1 to 10:1.

The ethylene/α-olefin interpolymer may alternatively be prepared in a gas phase polymerization process, using the catalysts as described above as supported in an inert support, such as silica. The ethylene/α-olefin interpolymer may further be made in a slurry polymerization process, using the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized.

Concerning the Presence of Modifying Polymers.

Depending on the intended end use for the adhesive, it is often desirable to add at least one compatible polymer in addition to the homogeneous ethylene/α-olefin interpolymer at concentrations up to 25 percent by weight to increase the cohesive strength, improve the sprayability, modify the open time, increase the flexibility, etc. This modifying polymer may be any compatible elastomer, such as a thermoplastic block copolymer, a polyamide, an amorphous or crystalline polyolefin such as polypropylene, polybutylene or polyethylene wherein $M_w$ is greater than 3000; an ethylenic copolymer such as ethylene-vinyl acetate (EVA), ethylene-methyl acrylate, or a mixture thereof. Surprisingly, the homogeneous ethylene/α-olefin interpolymers are also compatible with polyamides, resulting in plasticizer resistant pressure sensitive adhesives. The modifying polymer will typically be used in a relatively low concentration, so as not to detract from the improved properties of the homogeneous ethylene/α-olefin interpolymer. A preferred modifying polymer for increasing the open time and heat resistance is a polybutene-1 copolymer such as Duraflex™ 8910 (Shell).

Interpolymers of ethylene are those polymers having at least one comonomer selected from the group consisting of vinyl esters of a saturated carboxylic acid wherein the acid moiety has up to 4 carbon atoms, unsaturated mono- or dicarboxylic acids of 3 to 5 carbon atoms, a salt of the unsaturated acid, esters of the unsaturated acid derived from an alcohol having 1 to 8 carbon atoms, and mixtures thereof. Terpolymers of ethylene and these comonomers are also suitable. Ionomers, which are completely or partially neutralized copolymers of ethylene and the acids described above, are discussed in more detail in U.S. Pat. No. 3,264,272. In addition, terpolymers of ethylene/vinyl acetate/carbon monoxide or ethylene/methyl acrylate/carbon monoxide containing up to 15 weight percent carbon monoxide may also be employed.

The ethylene to unsaturated carboxylic comonomer weight ratio is preferably from 95:5 to 40:60, more preferably from 90:10 to 45:50, and even more preferably from 85:15 to 60:40. The melt index ($I_2$ at 190° C.) of these modifying interpolymers of ethylene may range from 0.1 to 150, preferably from 0.3 to 50, and more preferably from 0.7 to 10 g/10 min. Physical properties, principally elongation, are known to decline to lower levels when the ethylene copolymer melt index is above 30 g/10 min.

Suitable ethylene/unsaturated carboxylic acid, salt and ester interpolymers include ethylene/vinyl acetate (EVA) including, but not limited to, the stabilized EVA described in U.S. Pat. No. 5,096,955, incorporated herein by reference; ethylene/acrylic acid (EEA) and its ionomers; ethylene/methacrylic acid and its ionomers; ethylene/methyl acrylate; ethylene/ethyl acrylate; ethylene/isobutyl acrylate; ethylene/n-butyl acrylate; ethylene/isobutyl acrylate/methacrylic acid and its ionomers; ethylene/n-butyl acrylate/methacrylic acid and its ionomers; ethylene/isobutyl acrylate/acrylic acid and its ionomers; ethylene/n-butyl acrylate/acrylic acid and its ionomers; ethylene/methyl methacrylate; ethylene/vinyl acetate/methacrylic acid and its ionomers; ethylene/vinyl acetate/acrylic acid and its ionomers; ethylene/vinyl acetate/carbon monoxide; ethylene/methacrylate/carbon monoxide;

ethylene/n-butyl acrylate/carbon monoxide; ethylene/isobutyl acrylate/carbon monoxide; ethylene/vinyl acetate/monoethyl maleate; and ethylene/methyl acrylate/monoethyl maleate. Particularly suitable copolymers are EVA; EAA; ethylene/methyl acrylate; ethylene/isobutyl acrylate; and ethylene/methyl methacrylate copolymers and mixtures thereof. Certain properties, such as tensile elongation, are taught to be improved by certain combinations of these ethylene interpolymers, as described in U.S. Pat. No. 4,379,190. The procedures for making these ethylene interpolymers are well known in the art and many are commercially available.

Concerning the Tackifier.

As used herein, the term "tackifier" means any of the compositions described below which are useful to impart tack to the hot melt adhesive composition. ASTM D-1878-61T defines tack as "the property of a material which enables it to form a bond of measurable strength immediately on contact with another surface".

The adhesive of the invention will comprise from 0 to 95 weight percent of a tackifying resin. Typically, and particularly when it is desired to employ less than 30 weight percent of the homogeneous ethylene/α-olefin interpolymer, the adhesives will comprise from 10 to 75 weight percent, more typically from 20 to 60 weight percent tackifier.

In the alternative, in cases where it is desirable to employ at least 30 weight percent of the homogeneous ethylene/α-olefin interpolymer, the present invention advantageously provides adhesive formulations which contain minimal tackifier, and the like, less than 30 weight percent tackifier, preferably less than 25 weight percent tackifier, more preferably less than 20 weight percent tackifier, and most preferably less than 15 weight percent tackifier. In such applications, the homogeneous ethylene/α-olefin interpolymer will preferably be provided as a blend with a second homogeneous ethylene/α-olefin interpolymer. In such instances, adhesives containing less than 10 weight percent tackifier, and even adhesives having no tackifier, exhibit adequate tack.

In general terms, the tackifying resins useful in the adhesives of the invention comprise resins derived from renewable resources such as rosin derivatives including wood rosin, tall oil, gum rosin; rosin esters, natural and synthetic terpenes, and derivatives of such. Aliphatic, aromatic or mixed aliphatic-aromatic petroleum based tackifiers are also useful in the adhesives of this invention. Representative examples of useful hydrocarbon resins includes alpha-methyl styrene resins, branched and unbranched $C_5$ resins, $C_9$ resins, $C_{10}$ resins, as well as styrenic and hydrogenated modifications of such. Tackifying resins range from being a liquid at 37° C. to having a ring and ball softening point of about 135° C. Solid tackifying resins with a softening point greater than about 100° C., more preferably with a softening point greater than about 130° C. are particularly useful to improve the cohesive strength of the adhesives of the present invention, particularly when only a single homogeneous ethylene/α-olefin interpolymer is utilized.

For the adhesives of the invention, the preferred tackifying resin is predominantly aliphatic. However, tackifying resins with increasing aromatic character are also useful, particularly when a second tackifier or mutually compatible plasticizer is employed.

Concerning the Plasticizer.

A plasticizer is broadly defined as a typically organic composition that can be added to thermoplastics, rubbers and other resins to improve extrudability, flexibility, workability, or stretchability. In preferred embodiments of the invention, the plasticizer will be provdied to the adhesive in amounts up to 90 weight percent, preferably less than 30 weight percent of the adhesive. The plasticizer may be either a liquid or a solid at ambient temperature. Exemplary liquid plasticizers include hydrocarbon oils, polybutene, liquid tackifying resins, and liquid elastomers. Plasticizer oils are primarily hydrocarbon oils which are low in aromatic content and which are paraffinic or napthenic in character. Plasticizer oils are preferably low in volatility, transparent and have as little color and odor as possible. The use of plasticizers in this invention also contemplates the use of olefin oligomers, low molecular weight polymers, vegetable oils and their derivatives and similar plasticizing liquids.

When a solid plasticizing agent is employed, it will preferably have a softening point above 60° C. It is believed that by combining the homogeneous ethylene/α-olefin interpolymer with a suitable tackifying resin and a solid plasticizer such as a cyclohexane dimethanol dibenzoate plasticizer, the resulting adhesive composition may be applied at temperatures below 120° C., preferably below 100° C. Although a 1,4-cyclohexane dimethanol dibenzoate compound commercially available from Velsicol under the trade name Benzoflex™ 352 is exemplified, any solid plasticizer that will subsequently recrystallize in the compounded thermoplastic composition is suitable. Other plasticizers that may be suitable for this purpose are described in EP 0422 108 B1 and EP 0 410 412 B1, both assigned to H.B. Fuller Company.

Concerning Waxes.

Waxes may be usefully employed in the adhesive compositions of the present invention, particularly when the adhesive composition is intended to be relatively tack free upon cooling and solidifying, such as for various packaging and bookbinding applications as well as foam in place gaskets. Waxes are commonly used to modify the viscosity and reduce tack at concentrations up to 60 percent by weight, preferably less than about 25 percent by weight. Waxes useful in the adhesives of the present invention include paraffin waxes, microcrystalline waxes, Fischer-Tropsch, polyethylene and by-products of polyethylene wherein $M_w$ is less than 3000. More preferably, the concentration of wax is less than 35 percent by weight for high melt point waxes. At wax concentrations above 35 percent by weight, paraffin waxes are typically used.

Also suitable are ultra-low molecular weight ethylene/α-olefin interpolymers prepared using a constrained geometry catalyst, and may be referred to as homogeneous waxes. Such homogeneous waxes, as well as processes for preparing such homogeneous waxes, are set forth in the Examples below. Homogeneous waxes, in contrast to paraffinic waxes and crystalline ethylene homopolymer or interpolymer waxes, will have a $M_w/M_n$ of from 1.5 to 2.5, preferably from 1.8 to 2.2.

Homogeneous waxes will be either ethylene homopolymers or interpolymers of ethylene and a $C_3$–$C_{20}$ α-olefin. The homogeneous wax will have a number average molecular weight less than 6000, preferably less than 5000. Such homogeneous waxes will typically have a number average molecular weight of at least 800, preferably at least 1300.

Homogeneous waxes lead to a low polymer and formulation viscosity, but are characterized by peak crystallization temperatures which are greater than the peak crystallization temperatures of corresponding higher molecular weight materials of the same density. In adhesive applications, the increase in peak crystallization temperature translates to an increased heat resistance, and the like, improved creep resistance in pressure sensitive adhesives, and improved SAFT in hot melt adhesives.

Concerning the Presence of Other Additives.

As is known in the art, various other components can be added to modify the tack, color, odor, etc., of a hot melt adhesive. Additives such as antioxidants (for example, hindered phenolics (for example, Irganox™ 1010, Irganox™ 1076), phosphites (for example, Irgafos™ 168)), antiblock additives, pigments, and fillers, can also be included in the formulations. It is generally preferred that the additives should be relatively inert and have negligible effects upon the properties contributed by the homogeneous linear or substantially linear interpolymer, tackifying agent, and plasticizing oil.

Rheological Performance of Adhesives as Pressure Sensitive Adhesives.

As set forth in J. Class and S. Chu, Handbook of Pressure Sensitive Adhesive Technology, Second Edition, D. Satas, 1989, pages 158–204, the requirements for pressure sensitive adhesive behavior may be defined by temperature and rate dependent viscoelastic properties of the materials and formulations.

Broadly speaking, to be a suitable pressure sensitive adhesive, the formulations must have a glass transition temperature of from −45° C. to 30° C., preferably from −20° C. to 25° C., as reflected by the tan δ peak temperature at 1 radian per second, as determined by DMS.

According to what has come to be known as the Dahlquist criteria, broadly speaking, to be a suitable pressure sensitive adhesive, the formulation must have a plateau shear modulus at 25° C. at 1 radian per second which is between $1 \times 10^5$ and $4 \times 10^6$ dynes/cm$^2$ (0.01 to 0.4 MPa), preferably from $3 \times 10^5$ and $1 \times 10^6$ dynes/cm$^2$ (0.03 to 0.1 MPa), as determined by DMS. A material stiffer than this, and the like, a material which has a plateau shear modulus at 25° C. of $1 \times 10^7$ dynes/cm$^2$ (1 MPa), will not exhibit surface tack at room temperature. A material less stiff than this, and the like, a material which has a plateau shear modulus at 25° C. of $1 \times 10^4$ dynes/cm$^2$ (0.001 MPa) will lack sufficient cohesive strength to be useful.

The Dalquist criteria are useful to identify polymers which will have utility in various pressure sensitive adhesive applications. In particular, preferred pressure sensitive adhesives for use in low peel labels will have a G' of from $3 \times 10^5$ to $1 \times 10^6$ dynes/cm$^2$ (0.03 to 0.1 MPa) and a glass transition temperature of from −50 to −30° C. Preferred pressure sensitive adhesives for use in freezer labels will have a G' of from $8 \times 10^4$ to $2 \times 10^5$ dynes/cm$^2$ (0.008 to 0.02 MPa) and a glass transition temperature of from 45 to −30° C. Preferred pressure sensitive adhesives for use in cold temperature labels will have a G' of from $2 \times 10^5$ to $1 \times 10^6$ dynes/cm$^2$ (0.02 to 0.1 MPa) and a glass transition temperature of from −25 to −10° C. Preferred pressure sensitive adhesives for use in pressure sensitive adhesive tapes will have a G' of from $7 \times 10^5$ to $5 \times 10^6$ dynes/cm$^2$ (0.07 to 0.5 MPa) and a glass transition temperature of from −10 to 10° C. Preferred pressure sensitive adhesives for use in high peel labels will have a G' of from $2 \times 10^5$ to $6 \times 10^5$ dynes/cm$^2$ (0.02 to 0.06 MPa) and a glass transition temperature of from 0 to 10° C. Preferred pressure sensitive adhesives for use in disposables will have a G' of from $4 \times 10^5$ to $2 \times 10^6$ dynes/cm$^2$ (0.04 to 0.2 MPa) and a glass transition temperature of from 10 to 30° C.

Formulations Useful for Hot Melt Adhesives

The follow Table A sets forth useful and preferred weight percentages of various components of the adhesive formulations of the invention, including formulations which will be preferred when it is desirable to utilize less than 30 weight percent of the homogeneous ethylene/α-olefin interpolymer:

TABLE A

| | Hot Melt Adhesives | | Pressure Sensitive Adhesives | |
|---|---|---|---|---|
| | Useful | Preferred | Useful | Preferred |
| Homogeneous ethylene/ α-olefin interpolymer | 5–95 | 5–30 | 5–95 | 10–30 |
| Tackifier | 0–95 | 20–60 | 0–95 | 20–60 |
| Plasticizer (Oil) | 0 | 0 | 0–95 | 0–30 |
| Plasticizer (Solid) | <30 | 10–20 | 0–50 | 10–50 |
| Wax | 0–60 | 5–25 | <10 percent | <5 percent |

Processes for the Preparation of Hot Melt Adhesives.

The hot melt adhesives and pressure sensitive adhesives of the invention may be prepared by standard melt blending procedures. In particular, the first polymer(s), tackifier(s), and optional plasticizer(s) may be melt blended at an elevated temperature (from 150 to 200° C.) under an inert gas blanket until a homogeneous mix is obtained. Any mixing method producing a homogeneous blend without degrading the hot melt components is satisfactory, such as through the use of a heated vessel equipped with a stirrer.

Further, the homogeneous ethylene/α-olefin interpolymer (s), optional tackifier(s) and optional plasticizer(s) may be provided to an extrusion coater for application to the substrate.

When the ethylene/α-olefin interpolymer is a blend of two or more ethylene/α-olefin interpolymers, it will be preferred to prepare the pressure sensitive adhesives using a dual reactor configuration, with one of the polymers being produced in the first reactor, the other of the polymers being produced in a second reactor, and the tackifier(s) and optional plasticizer(s) being optionally provided, typically at a point after the second reactor, via a side-arm extruder. In this embodiment, pressure sensitive adhesives can be provided in forms such as pellets, pillows, or any other desired configuration. Examples of such a process which may be adapted in accordance with the teachings of this disclosure to prepare blends of a homogenous linear (higher molecular weight or ultra-low molecular weight) or substantially linear ethylene/α-olefin interpolymer, wax, and optional tackifier, are disclosed in WO 94/00500 and WO 94/01052.

The hot melt adhesives of the present invention can be applied by extrusion, spiral spray, meltblown, spray-splatter, screen printing, or roll coating by delivery from bulk or reservoirs capable of controlling the temperature within a range from about 250° F. to about 400° F. Packaging and bookbinding applications, particularly for adhesives which are relatively tack-free upon cooling are specifically within the scope of the present invention. However, any adhesive application pertaining to bonding a paper substrate selected from the group consisting of Kraft paper, coated paper, highly filled paper, laminated paper, etc. to any other paper substrate and/or polymeric film substrate is also contemplated, especially when applied by extrusion or lamination by roll coaters.

Test Methods

Unless indicated otherwise, the following testing procedures are employed:

Density is measured in accordance with ASTM D-792. The samples are annealed at ambient conditions for 24 hours before the measurement is taken.

Melt index ($I_2$), is measured in accordance with ASTM D-1238, condition 190° C./2.16 kg (formally known as "Condition (E)").

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min. and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968, incorporated herein by reference) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

Fineline & Spray

Adjust the hot melt applicator and laminator to proper setting.

| | |
|---|---|
| Nip Pressure | 15 psi (0.1 MPa) |
| Spiral Spray | 4 mg/in² (26 mg/cm²) |
| Fineline | 1.4 mg/in (3.6 mg/cm) |
| Web Speed | 400–500 ft/min (120–150 meters/min) |
| Air Temp. | 50° F. (10° C.) above application temp |
| Nozzle Distance from Substrate | 30–60 mm |

Prepare fineline and spray bonds using the settings indicated above. During the run, drop eight to ten 2 inch by 8 inch (5 cm by 20 cm) strips of release paper cross directional across the web to serve as starting points for the T-peel evaluation. Cut 10 samples one bead or one spray spiral in width by 3 inches (7.6 cm) in length. Run T-peels on a slip/peel tester, Instron or other suitable measuring device at 12 inches (30 cm) per minute Report the average of 10 samples.

T-Peels

This test method describes how to measure the removal force of an adhesive surface bonded to a fabric substrate.

Material and Equipment:

1. Mechanical roll-down device with 4.5 pound (2 kg) roller.

Available through: Engineering Service, Glenview Ill. 60025

2. Slip Peel Tester

Available though: Instrumentors, Inc., Cleveland, Ohio 44136

The first step is to prepare hot melt coated adhesive films on Mylar or polyolefin film using a suitable coating device at an appropriate application temperature. During preparation of the adhesive film, the adhesive surface is covered with release paper to facilitate handling. The coat weight is checked targeting 25 g/m²+/−3 g/m².

The adhesive coated films are cut into 1 inch (2.5 cm) wide strips which are 4 inches (10 cm) in length in the machine direction. At one end of each strip, fold approximately ¼ inch (0.6 cm) of the strip onto itself to create a grip. Remove the release paper and place the adhesive surface of one 1 inch (2.5 cm) wide strip onto knit cotton test kit to form a compositie. Place the composite on the mechanical roll-down device, and allow the roller two passes over the sample, one forward and one back. A timer is activated and the sample is placed into the jaws of the slip-peel tester. The 1 inch (2.5 cm) wide strip is placed into the mobile jaw and the fabric is placed in the stationary jaw. No more than 1 minute after the sample has been removed from the roll-down device, the sample is peeled at 12 inches per minute (30 cm/min), averaging over 10 seconds. The procedure is repeated five times, recording the average T-peel value and noting any legging or transfer. The T-peel values are reported in grams per linear inch. In the disposable article industry, it is preferred to have T-peels in the 100–500 g range, most preferred in the 200–500 g range without adhesive transfer.

Oil Exudation

Approximately 20 g of the adhesive is poured onto release paper. (Akrosil F1U-F4B Silox, 40-60#) After cooling for about 4 hours, the adhesive is evaluated for oil exudation. "Pass" indicates that the adhesive is removable from the release paper without visibly staining the release paper.

PAFT & SAFT

Each adhesive sample was coated onto Kraft paper by hand using glass rods or shims. The resultant coating is a 1 inch (2.5 cm) wide band that is about 8–10 mils or 0.008 to 0.010 inches 0.2 to 0.25 mm) thick. After conditioning the bonds at room temperature for at least 16 hours, the peel adhesion failure temperature (PAFT) and shear adhesion failure temperature (SAFT) were determined by placing samples in a programmed oven with 100 gram weights for the peel mode and 500 gram weights for the shear mode, ramping the temperature up from 25° C. to 175° C. at a rate of 25° C./hour. The oven automatically records the temperature at which the samples fail. The reported result is the average failure temperature of four to five bonds.

Bonding Tests

Adhesive bonds were made on various substrates using an application temperature of about 175° C., an open time of about 1 second, a set time of about 1 second, and a bead size ranging from 1/16 inch (2.5 mm) to ⅛ inch (3.1 mm). The resulting bonds were then conditioned for at least 24 hours, separated by hand and the amount of fiber tear determined. A minimum of three samples were tested for each adhesive at each condition reporting the average fiber tear.

Cloud Point

A 25 mm×150 mm Pyrex test tube is filled ¾ full with molten hot melt adhesive at a temperature of about 177° C. A thermometer is inserted into the molten hot melt resting against the test tube wall. The "cloud point" is the temperature at which the thermometer markings are no longer visible when observed through the test tube wall opposite the thermometer.

Ultimate Tensile & Elongation

Prepare a 20–30 mil (0.5–0.7 mm) thick adhesive film free of air bubbles on a polytetrafluoroethylene or aluminum sheet. Cut 7 dogbones lengthwise from the film measuring the thickness at the gauge section. Condition the samples for at least 24 hours at 21° C. and 23 to 50 percent relative humidity. Place each sample in the jaws of an Instron tensile tester or equivalent with a load cell capable of measuring a 4 pounds (1.8 kg) force +/−1 percent. Elongate samples at a 10 inches/minute (20.5 cm/min) crosshead speed until break. Record the "Ultimate Tensile" at yield by dividing the maximum force by the cross-section area of the sample and "percent Elongation" by dividing the displacement at break by the sample length and multiply by 100. The "Ultimate Tensile" and "percent Elongation" are an average of at least five samples.

Cold Crack

Prepare several 1 inch by 3 inch (2.5 cm by 7.6 cm) adhesive films free of air bubbles which are 20–30 mils (0.5–0.7 mm) in thickness. Place three films individually over the v-shaped base of a cold crack apparatus which consists of a stand with an interlocking pressure bar. The stand is 3 inches (7.6 cm) by 0.75 inch (1.9 cm) wide and 12 inches (30 cm) long. A 90° angle is cut squarely 1 inch (1.3 cm) deep into the top surface. Place the pressure bar, which is also cut at a 90° angle, into the gap of the stand. This test is repeated lowering the temperature at 5° F. (3° C.) increments with a new film sample for each temperature until the film cracks. The recorded "Cold Crack" is an average of at least 2 samples.

Melt Viscosity

Melt viscosity is determined in accordance with the following procedure using a Brookfield Laboratories DVII+ Viscometer in disposable aluminum sample chambers. The spindle used is a SC-31 hot-melt spindle, suitable for measuring viscosities in the range of from 10 to 100,000 centipoise. A cutting blade is employed to cut samples into pieces small enough to fit into the 1 inch (2.5 cm) wide and 5 inches (13 cm) long sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to 350° F. (177° C.), with additional sample being added until the melted sample is about 1 inch (2.5 cm) below the top of the sample chamber. The viscometer apparatus is lowered and the spindle submerged into the sample chamber.

Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

G', G", and Peak Tan Delta

G', G", and peak tan delta, are determined as follows. The samples are examined using melt rheology techniques on a Rheometrics RDA-II Dynamic Analyzer. The Temperature-Step mode is used utilizing the 7.9 mm diameter parallel plates geometry. The sweep is run from approximately −70° C. to 250° C. at 5° C. per step with 30 seconds equilibration delay at each step. The oscillatory frequency is 1 radian/second with an autostrain functions of 0.1 percent strain initially, increasing in positive 100 percent adjustments when ever the torque decreased to 10 gram-centimeters. The maximum strain is set at 26 percent. The autotension function is used in the compression direction with a force of −3, sensitivity at 15, and switching occurring at 100 dynes/cm$^2$ (10 Pa). The plates are used with an initial gap of 1.5 mm at 160° C. (the sample aliquots are inserted in the RDS-II at 160° C.). The "HOLD" function is engaged at 160° C. and the instrument was cooled to −70° C. and the test started (the "HOLD") function corrects for the thermal expansion or contraction of the test chamber is heated or cooled). The Samples are maintained in a nitrogen environment throughout the analyses to minimize oxidative degradation. Data reduction and manipulation are accomplished by the Rheometrics, Inc. RHIOS computer programs (version 4.4.0). The computer software plots G' (the dynamic storage modulus of the sample), G" (the dynamic loss modulus of the sample), tan delta (G'/G"), and peak tan delta (a representation of the glass transition temperature).

Probe Tack

Probe tack is determined in accordance with ASTM D-2979-71, using a dwell time of 10 seconds and a probe separation rate of 1 cm/sec.

TABLE OF CONTENTS FOR THE EXAMPLES

I. Hot Melt Adhesive Examples
   Catalyst Preparation
   Polymerization of ultra-low molecular weights polymers and waxes.
      Table One—Polymers A–D and Waxes 1–3 Polymerization Conditions.
      Table Two—Polymers E–F and Wax 4 Polymerization Conditions.
   Hot Melt Adhesive Examples
      Table Three—Examples HMA-1 to HMA-9
      Table Four—Examples HMA-10 to HMA-15
      Table Five—Examples HMA-16 to HMA-24
      Examples 25 and 26

II. Hot Melt Pressure Sensitive Adhesive Examples
   Preparation of Adhesives
      Table Six—Examples PSA-27 TO PSA-32
      Table Seven—Examples PSA-33 to PSA-34

III. Application Specific Adhesive Examples
   Tables Eight and Eight-A—Interpolymers and Formulation Components
   Table Nine—Nonwoven Construction Adhesives
   Table Ten—Nonwoven Construction Bonding Results
   Table Eleven—Thermal Stability of Adhesives
   Table Twelve—Positioning Adhesives
   Table Thirteen—Additional PSA Examples
   Table Fourteen—Additional Interpolymer/EVA Blends
   Table Fifteen—Target Bookbinding Properties
   Tables Sixteen A and B—Bookbinding
   Table Seventeen—Case and Carton Seal
   Tables Eighteen A,B,C—Packaging Adhesives
   Tables Nineteen A to E—Interpolymer/Oil Blends
   Tables Twenty A and B—Interpolymer/Polyamide Blends
   Table Twenty-One—Insulation Bonding I. Hot Melt Adhesive Examples Catalyst Preparation One Part 1: Preparation of TiCl$_3$(DME)$_{1.5}$ The apparatus (referred to as R-1) was set-up in the hood and purged with nitrogen; it consisted of a 10 L glass kettle with flush mounted bottom valve, 5-neck head, polytetrafluoroethylene gasket, clamp, and stirrer components (bearing, shaft, and paddle). The necks were equipped as follows: stirrer components were put on the center neck, and the outer necks had a reflux condenser topped with gas inlet/outlet, an inlet for solvent, a thermocouple, and a stopper. Dry, deoxygenated dimethoxyethane (DME) was added to the flask (approx. 5 L). In the drybox, 700 g of TiCl$_3$ was weighed into an equalizing powder addition funnel; the funnel was capped, removed from the drybox, and put on the reaction kettle in place of the stopper. The TiCl$_3$ was added over about 10 minutes with stirring. After the addition was completed, additional DME was used to wash the rest of the TiCl$_3$ into the flask. The addition funnel was replaced with a stopper, and the mixture heated to reflux. The color changed from purple to pale blue. The mixture was heated for about 5 hours, cooled to room temperature, the solid was allowed to settle, and the supernatant was decanted from the solid. The TiCl$_3$(DME)$_{1.5}$ was left in R-1 as a pale blue solid.

Part 2: Preparation of [(Me$_4$C$_5$)SiMe$_2$N-t-Bu][MgCl]$_2$

The apparatus (referred to as R-2) was set-up as described for R-1, except that flask size was 30 L. The head was equipped with seven necks; stirrer in the center neck, and the outer necks containing condenser topped with nitrogen inlet/outlet, vacuum adapter, reagent addition tube, thermocouple, and stoppers. The flask was loaded with 4.5 L of toluene, 1.14 kg of (Me$_4$C$_5$H)SiMe$_2$NH-t-Bu, and 3.46 kg of 2 M i-PrMgCl in Et$_2$O. The mixture was then heated, and the ether allowed to boil off into a trap cooled to −78° C. After four hours, the temperature of the mixture had reached 75° C. At the end of this time, the heater was turned off and DME was added to the hot, stirring solution, resulting in the formation of a white solid. The solution was allowed to cool to room temperature, the material was allowed to settle, and the supernatant was decanted from the solid. The [(Me$_4$C$_5$)SiMe$_2$N-t-Bu][MgCl]$_2$ was left in R-2 as an off-white solid.

Part 3: Preparation of [($\eta^5$-Me$_4$C$_5$)SiMe$_2$N-t-Bu]TiMe$_2$

The materials in R-1 and R-2 were slurried in DME (3 L of DME in R-1 and 5 L in R-2). The contents of R-1 were transferred to R-2 using a transfer tube connected to the bottom valve of the 10 L flask and one of the head openings in the 30 L flask. The remaining material in R-1 was washed over using additional DME. The mixture darkened quickly to a deep red/brown color, and the temperature in R-2 rose from 21° C. to 32° C. After 20 minutes, 160 mL of CH$_2$Cl$_2$ was added through a dropping funnel, resulting in a color change to green/brown. This was followed by the addition of 3.46 kg of 3 M MeMgCl in THF, which caused a temperature increase from 22° C. to 5° C. The mixture was stirred for 30 minutes, then 6 L of solvent was removed under vacuum. Isopar™ E hydrocarbon (6 L) was added to the flask. This vacuum/solvent addition cycle was repeated, with 4 L of solvent removed and 5 L of Isopar™ E hydrocarbon added. In the final vacuum step, an additional 1.2 L of solvent was removed. The material was allowed to settle overnight, then the liquid layer decanted into another 30 L glass kettle (R-3). The solvent in R-3 was removed under vacuum to leave a brown solid, which was re-extracted with Isopar E; this material was transferred into a storage cylinder. Analysis indicated that the solution (17.23 L) was 0.1534 M in titanium; this is equal to 2.644 moles of [($\eta^5$-Me$_4$C$_5$)SiMe$_2$N-t-Bu]TiMe$_2$. The remaining solids in R-2 were further extracted with Isopar™ E hydrocarbon, the solution was transferred to R-3, then dried under vacuum and re-extracted with Isopar™ E hydrocarbon. This solution was transferred to storage bottles; analysis indicated a concentration of 0.1403 M titanium and a volume of 4.3 L (0.6032 moles [($\eta^5$-Me$_4$C$_5$)SiMe$_2$N-t-Bu]TiMe$_2$). This gives an overall yield of 3.2469 moles of [($\eta^5$-Me$_4$C$_5$)SiMe$_2$N-t-Bu]TiMe$_2$, or 1063 g. This is a 72 percent yield overall based on the titanium added as TiCl$_3$.

Catalyst Preparation Two

Part 1: Preparation of TiCl$_3$(DME)$_{1.5}$

The apparatus (referred to as R-1) was set-up in the hood and purged with nitrogen; it consisted of a 10 L glass kettle with flush mounted bottom valve, 5-neck head, polytetrafluorethylene gasket, clamp, and stirrer components (bearing, shaft, and paddle). The necks were equipped as follows: stirrer components were put on the center neck, and the outer necks had a reflux condenser topped with gas inlet/outlet, an inlet for solvent, a thermocouple, and a stopper. Dry, deoxygenated dimethoxyethane (DME) was added to the flask (approx. 5.2 L). In the drybox, 300 g of TiCl$_3$ was weighed into an equalizing powder addition funnel; the funnel was capped, removed from the drybox, and put on the reaction kettle in place of the stopper. The TiCl$_3$ was added over about 10 minutes with stirring. After the addition was completed, additional DME was used to wash the rest of the TiCl$_3$ into the flask. This process was then repeated with 325 g of additional TiCl$_3$, giving a total of 625 g. The addition funnel was replaced with a stopper, and the mixture heated to reflux. The color changed from purple to pale blue. The mixture was heated for about 5 hours, cooled to room temperature, the solid was allowed to settle, and the supernatant was decanted from the solid. The TiCl$_3$(DME)$_{1.5}$ was left in R-1 as a pale blue solid.

Part 2: Preparation of [(Me$_4$C$_5$)SiMe$_2$N-t-Bu][MgCl]$_2$

The apparatus (referred to as R-2) was set-up as described for R-1, except that flask size was 30 L. The head was equipped with seven necks; stirrer in the center neck, and the outer necks containing condenser topped with nitrogen inlet/outlet, vacuum adapter, reagent addition tube, thermocouple, and stoppers. The flask was loaded with 7 L of toluene, 3.09 kg of 2.17 M i-PrMgCl in Et$_2$O, 250 mL of THF, and 1.03 kg of (Me$_4$C$_5$H)SiMe$_2$NH-t-Bu. The mixture was then heated, and the ether allowed to boil off into a trap cooled to −78° C. After three hours, the temperature of the mixture had reached 80° C., at which time a white precipitate formed. The temperature was then increased to 90° C. over 30 minutes and held at this temperature for 2 hours. At the end of this time, the heater was turned off, and 2 L of DME was added to the hot, stirring solution, resulting in the formation of additional precipitate. The solution was allowed to cool to room temperature, the material was allowed to settle, and the supernatant was decanted from the solid. An additional wash was done by adding toluene, stirring for several minutes, allowing the solids to settle, and decanting the toluene solution. The [(Me$_4$C$_5$)SiMe$_2$N-t-Bu][MgCl]$_2$ was left in R-2 as an off-white solid.

Part 3: Preparation of [($\eta^5$-Me$_4$C$_5$)SiMe$_2$N-t-Bu]Ti($\eta^4$-1,3-pentadiene)

The materials in R-1 and R-2 were slurried in DME (the total volumes of the mixtures were approximately 5 L in R-1 and 12 L in R-2). The contents of R-1 were transferred to R-2 using a transfer tube connected to the bottom valve of the 10 L flask and one of the head openings in the 30 L flask. The remaining material in R-1 was washed over using additional DME. The mixture darkened quickly to a deep red/brown color. After 15 minutes, 1050 mL of 1,3-pentadiene and 2.60 kg of 2.03 M n-BuMgCl in THF were added simultaneously. The maximum temperature reached in the flask during this addition was 53° C. The mixture was stirred for 2 hours, then approximately 11 L of solvent was removed under vacuum. Hexane was then added to the flask to a total volume of 22 L. The material was allowed to settle, and the liquid layer (12 L) was decanted into another 30 L glass kettle (R-3). An additional 15 liters of product solution was collected by adding hexane to R-2, stirring for 50 minutes, again allowing to settle, and decanting. This material was combined with the first extract in R-3. The solvent in R-3 was removed under vacuum to leave a red/black solid, which was then extracted with toluene. This material was transferred into a storage cylinder. Analysis indicated that the solution (11.75 L) was 0.255 M in titanium; this is equal to 3.0 moles of $[(\eta^5\text{-}Me_4C_5)SiMe_2N\text{-}t\text{-}Bu]Ti(\eta^4\text{-}1,3\text{-}pentadiene)$ or 1095 g. This is a 74 percent yield based on the titanium added as $TiCl_3$.

Polymerization of Ultra-Low Molecular Weight Polymers and Waxes

Polymers A–D and Waxes 1–3 were produced in a solution polymerization process using a continuously stirred reactor. Polymers A, B, and C, and Wax 1 were each stabilized with 1250 ppm calcium stearate, 500 ppm Irganox™ 1076 hindered polyphenol stabilizer (available from Ciba-Geigy Corporation), and 800 ppm PEPQ (tetrakis(2,4-di-t-butylphenyl)-4,4'-biphenylene diphosphonite) (available from Clariant Corporation). Polymer D and Waxes 2 and 3 were each stabilized with 500 ppm Irganox™ 1076 hindered polyphenol stabilizer, 800 ppm PEPQ, and 100 ppm water (as a catalyst kill agent).

The ethylene and the hydrogen were combined into one stream before being introduced into the diluent mixture, a mixture of $C_8$–$C_{10}$ saturated hydrocarbons, for example, ISOPAR-E hydrocarbon mixture (available from Exxon Chemical Company) and the comonomer. For polymers A, B, C, and D and for Waxes 1 and 2 the comonomer was 1-octene; Wax 3 had no comonomer. The reactor feed mixture was continuously injected into the reactor.

The metal complex and cocatalysts were combined into a single stream and were also continuously injected into the reactor. For Polymers A, B, and C and Wax 1, the catalyst was as prepared in Catalyst Preparation One set forth above. For Polymer D and Waxes 2 and 3, the catalyst was as prepared in Catalyst Preparation Two set forth above. For each Polymer and Wax, the co-catalyst was tris(pentafluorophenyl)borane, available as a 3 wt percent solution in Isopar™-E mixed hydrocarbon, from Boulder Scientific. Aluminum was provided in the form of a solution of modified methylalumoxane (MMAO Type 3A) in heptane, which is available at a 2 wt percent aluminum concentration from Akzo Nobel Chemical Inc.

Sufficient residence time was allowed for the metal complex and cocatalyst to react prior to introduction into the polymerization reactor. In each polymerization reaction, the reactor pressure was held constant at about 475 psig (3.3 MPa). Ethylene content of the reactor, in each polymerization, after reaching steady state, was maintained at the conditions specified in Table One.

After polymerization, the reactor exit stream was introduced into a separator where the molten polymer is separated from the unreacted comonomer(s), unreacted ethylene, unreacted hydrogen, and diluent mixture stream. The molten polymer was subsequently strand chopped or pelletized, and, after being cooled in a water bath or pelletizer, the solid pellets were collected. Table One describes the polymerization conditions and the resultant polymer properties.

TABLE ONE

|  | Polymer A | Polymer B | Polymer C | Polymer D | Wax 1 | Wax 2 | Wax 3 |
| --- | --- | --- | --- | --- | --- | --- | --- |
| Ethylene feed (lb/hr (kg/hr)) | 2.0 (0.9) | 2.0 (0.9) | 2.0 (0.9) | 3.0 (1.4) | 3.0 (1.4) | 3.0 (1.4) | 3.0 (1.4) |
| Comonomer: olefin ratio (mole percent) | 12.40 | 8.50 | 12.50 | 9.10 | 0.40 | 1.24 | 0.00 |
| Hydrogen: ethylene ratio (weight basis) | 0.26 | 0.66 | 1.26 | 0.54 | 1.60 | 2.14 | 2.14 |
| Diluent: ethylene ratio (weight basis) | 10.60 | 9.30 | 11.10 | 9.99 | 5.90 | 7.69 | 7.70 |
| Catalyst metal concentration (ppm) | 4 | 2 | 4 | 3 | 5 | 32 | 32 |
| Catalyst flow rate (lb/hr (kg/hr)) | 0.272 (0.123) | 0.386 (0.175) | 0.428 (0.194) | 0.450 (0.205) | 0.626 (0.285) | 0.304 (0.138) | 0.294 (0.134) |
| Co-catalyst concentration (ppm) | 88 | 44 | 88 | 88 | 353 | 1430 | 1430 |
| Co-catalyst flow rate (lb/hr (kg/hr)) | 0.396 (0.180) | 0.561 (0.254) | 0.624 (0.283) | 0.490 (0.223) | 0.284 (0.129) | 0.219 (0.100) | 0.211 (0.096) |
| Aluminum concentration (ppm) | 10 | 5 | 10 | 9.8 | 20 | 120.0 | 120.0 |
| Aluminum flow rate (lb/hr) | 0.375 (0.170) | 0.528 (0.240) | 0.590 (0.268) | 0.468 (0.213) | 0.534 (0.243) | 0.323 (0.147) | 0.311 (0.141) |
| Reactor temperature (° C.) | 110 | 110 | 110 | 110 | 140 | 110 | 110 |
| Ethylene concentration in reactor exit stream (weight percent) | 1.80 | 2.99 | 1.65 | 1.71 | 4.41 | 1.80 | 1.69 |
| Polymer density (g/cm$^3$) | 0.875 | 0.897 | 0.870 | 0.883 | 0.968 | 0.948 | 0.960 |
| Polymer melt viscosity at 350° F. (centipoise) | 39,000* | 5200 | 355 | 5000 | 395 | 350 | 512 |
| Polymer melt index ($I_2$ at 190° C.) | 246 | 1500* | 16,000* | 1500* | 15,000* | 16,000* | 12,000* |
| Polymer Mw | 30,100 | 15,600 | 7,900 | 16,200 | 7,300 | 6,900 | 7,400 |
| Polymer Mn | 17,100 | 8,700 | 4,300 | 8,200 | 3,700 | 3,200 | 3,200 |

TABLE ONE-continued

|  | Polymer A | Polymer B | Polymer C | Polymer D | Wax 1 | Wax 2 | Wax 3 |
|---|---|---|---|---|---|---|---|
| Polymer Mw/Mn | 1.76 | 1.79 | 1.84 | 1.98 | 1.97 | 2.16 | 2.31 |
| Peak crystallization temperature by DSC (° C.) | 55.73 | 59.05 | 78.57 | 69.27 | 114.76 | 109.88 | 116.39 |
| Peak melting temperature by DSC (° C.) | 68 | 67 | 91.04 | 81.97 | 127.6 | 120.5 | 131.11 |
| Total percent crystallinity by DSC | 18.94 | 19.55 | 36.3 | 28.18 | 79.62 | 72.81 | 72.84 |

*Calculated on the basis of melt viscosity corrections in accordance with the formula:
$I_2 = 3.6126(10^{(\log(\eta) - 6.6928)/-1.1363}) - 9.3185$, where $\eta$ = melt viscosity at 350° F.

Polymers E and F and Wax 4 were produced in a solution polymerization process using a well-mixed recirculating loop reactor. Each polymer was stabilized with 2000 ppm Irganox™ 1076 hindered polyphenol stabilizer (available from Ciba-Geigy Corporation) and 35 ppm deionized water (as a catalyst kill agent).

The ethylene and the hydrogen (as well as any ethylene and hydrogen which were recycled from the separator, were combined into one stream before being introduced into the diluent mixture, a mixture of $C_8$–$C_{10}$ saturated hydrocarbons, for example, Isopar™-E hydrocarbon (available from Exxon Chemical Company) and the comonomer 1-octene.

The metal complex and cocatalysts were combined into a single stream and were also continuously injected into the reactor. The catalyst was as prepared in Catalyst Description Two set forth above; the primary cocatalyst was tri(pentafluorophenyl)borane, available from Boulder Scientific as a 3 wt percent solution in ISOPAR-E mixed hydrocarbon; and the secondary cocatalyst was modified methylalumoxane (MMAO Type 3A), available from Akzo Nobel Chemical Inc. as a solution in heptane having 2 wt percent aluminum.

Sufficient residence time was allowed for the metal complex and cocatalyst to react prior to introduction into the polymerization reactor. The reactor pressure was held constant at about 475 psig (3.3 MPa).

After polymerization, the reactor exit stream was introduced into a separator where the molten polymer was separated from the unreacted comonomer(s), unreacted ethylene, unreacted hydrogen, and diluent mixture stream, which was in turn recycled for combination with fresh comonomer, ethylene, hydrogen, and diluent, for introduction into the reactor. The molten polymer was subsequently strand chopped or pelletized, and, after being cooled in a water bath or pelletizer, the solid pellets were collected. Table Two describes the polymerization conditions and the resultant polymer properties.

TABLE TWO

|  | Polymer E | Polymer F | Wax 4 |
|---|---|---|---|
| Ethylene fresh feed rate (lbs/hr (kg/hr)) | 140 (63.5) | 140 (63.5) | 140 (63.5) |
| Total ethylene feed rate (lbs/hr (kg/hr)) | 146.2 (66.32) | 146.17 (66.30) | 146.5 (66.45) |
| Fresh octene feed rate (lbs/hr (kg/hr)) | 45.4 (20.6) | 49.5 (22.4) | 12.67 (5.75) |
| Total octene feed rate (lbs/hr (kg/hr)) | Not determined | 112 (50.8) | 32.9 (14.9) |
| Total octene concentration (weight percent) | Not determined | 11.4 | 3.36 |
| Fresh hydrogen feed rate (standard cm³/min.) | 4025 | 5350 | 16100 |
| Solvent and octene feed rate (lbs/hr (kg/hr)) | 840 (381) | 839.4 (381) | 840 (381) |
| Ethylene conversion rate (wt percent) | 90.7 | 90.3 | 88.26 |
| Reactor temperature (° C.) | 109.86 | 119.8 | 134.3 |
| Feed temperature (° C.) | 15 | 15 | 15.3 |
| Catalyst concentration (ppm) | 70 | 70 | 70 |
| Catalyst flow rate (lbs/hr (kg/hr)) | 0.725 (0.329) | 1.265 (0.5738) | 4.6 (2.1) |
| Primary cocatalyst concentration (ppm) | 1200 | 2031 | 1998 |
| Primary cocatalyst flow rate (lbs/hr (kg/hr)) | 2.96 (1.34) | 1.635 (0.7416) | 5.86 (2.66) |
| Titanium:boron molar ratio | 2.96 | 3.48 | 2.897 |
| Secondary cocatalyst concentration (ppm) | 198 | 198 | 198 |
| Secondary cocatalyst flow rate (lbs/hr (kg/hr)) | 0.718 (0.326) | 1.258 (0.571) | 3.7 (1.7) |
| Titanium:aluminum molar ratio | 5 | 4.986 | 4.037 |
| Product density (g/cm³) | 0.8926 | 0.8925 | 0.9369 |
| Product melt viscosity at 350° F. (centipoise) | 12,500 | 4,000 | 400 |
| Polymer melt index ($I_2$ at 190° C.)* | 686* | 1,900* | 14,000* |
| Polymer $M_n$ | 12,300* | 8,900* | 4,700* |

*Calculated on the basis of melt viscosity correlations in accordance with the formulas:
$I_2 = 3.6126(10^{(\log(\eta)-6.6928)/-1.1363}) - 9.3185$, $M_n = 10^{[(\log\eta+10.46)/3.56]}$ where $\eta$ = melt viscosity at 350° F.

Polymer G was prepared as follows. To a 4 liter autoclave stirred reactor, 865.9 g of Isopar™-E hydrocarbon (available from Exxon Chemical Company) and 800.4 g 1-octene were charged. The reactor was heated to 120° C. and hydrogen was added from a 75 cc cylinder. Hydrogen was added to cause a 250 psig (1.7 MPa) pressure drop in the cylinder. The reactor was then pressurized to 450 psig (3.1 MPa) of ethylene. Catalyst was added at the rate of 1 cc/min. The catalyst was as prepared in the Catalyst Preparation One set forth above. Prior to introduction into the reactor, the catalyst was mixed with the cocatalysts at a ratio of 1.5 mL of a 0.005 M solution of Catalyst Preparation One in an inert hydrocarbon such as Isopar™-E hydrocarbon mixture, 1.5 mL of a 0.015 M solution of tris(pentafluorophenyl)borane in Isopar™-E hydrocarbon mixture (a 3 wt percent solution of tris(pentafluorophenyl)borane in Isopar™-E hydrocarbon mixture is available from Boulder Scientific), 1.5 mL of a 0.05 M solution of modified methylalumoxane in Isopar™-E hydrocarbon mixture (MMAO Type 3A) (a solution of MMAO Type 3A in heptane with a 2 wt percemt aluminum content is available from Akzo Nobel Chemical Inc.), and 19.5 mL of Isopar™-E hydrocarbon mixture. Ethylene was supplied on demand. The reactor temperature and pressure were set at 120° C. and 450 psig (3.1 MPa), respectively. The reaction continued for 23.1 minutes. At this time, the agitation was stopped and the reactor contents transferred to a glass collection kettle. The reactor product was dried in a vacuum oven overnight. The ethylene/octene product thus prepared had a density of 0.867 g/cm$^3$, and an I$_2$ at 190° C. of 842 g/10 min.

EXAMPLES 1–9

HMA's Comprising Polymer, Tackifier, Wax, and Antioxidant

The indicated polymer, tackifier, wax, and antioxidant were simultaneously added in the indicated amounts to a Haake Rheocord 40 mixer using a 200 gram mixing bowl maintained at about 130° C. at 95 revolutions per minute. The ingredients were mixed for about 5 minutes, until they became molten.

Polymers A–C and Wax 1 were prepared by the procedures set forth above.

Polywax 2000 ethylene homopolymer is available from Petrolite, Inc. (Tulsa, Okla.). Polywax 2000 has a molecular weight of approximately 2000, an M$_w$/M$_n$ of approximately 1.0, a density at 16° C. of about 0.97 g/cm$^3$, and a melting point of approximately 126° C.

CP Hall 1246 paraffinic wax is available from CP Hall (Stow, Ohio). CP Hall 1246 paraffinic wax has a melting point of 143° F., a viscosity at 210° F. of 4.2 centipoise, and a specific gravity at 73° F. of 0.915.

Escorez E1310LC petroleum hydrocarbon resin is a tackifier available from Exxon Chemical Company (Houston, Tex.). Escorez E1310LC has a density of 0.97 g/cm$^3$ at 64° F, a molecular weight as determined by gel permeation chromatography of 1450, a viscosity at 177° F of 300 centipoise, and an M$_w$/M$_n$ of 2.1.

Foral 105 pentaerythritol ester of hydrogenated rosin is a tackifier available from Hercules Incorporated (Wilmington, Del.).

Piccotac™ 115 aliphatic hydrocarbon resin is a tackifier available from Hercules Incorporated (Wilmington, Del.).

Irganox™ 1010 hindered phenolic antioxidant is available from Ciba-Geigy.

Hot melt adhesives HMA-1 through HMA-9 were tested for initial viscosity and viscosity after three days, using a Brookfield viscometer at 350° F. (177° C.).

Hot melt adhesives HMA-3, 4, and 7 were tested for shear adhesion failure temperature (SAFT) in accordance with the following procedure. A one inch by one inch (2.5 cm by 2.5 cm) lap shear bond to case cartons using the indicated HMA in its molten state, was prepared. Samples were hung vertically in an air circulating oven at 30° C. with a 500 gram weight suspended from the bottom of the strip, except in the case of HMA-7 in which a 100 gram weight was used. The oven temperature was increased by 5° C. every 30 minutes until the adhesive bond failed. The shear-fail temperature was the average of three SAFT measurements.

Hot melt adhesives HMA-1 through HMA-5 were tested for low temperature adhesion in accordance with the following procedure. A one inch by one inch (2.5 cm by 2.5 cm) lap shear bond to case cartons and to 20 point boards, using the indicated HMA in its molten state, was prepared. The samples were placed in a refrigerated oven at −30° C. for about 4 hours. The samples were taken from the oven one at a time and are tested for paper tear using a 0.125 inch (3 mm) mandrel.

The hot melt adhesives (HMA's) formulated in this manner are set forth in the following Table Three, as well as the measured initial viscosity, viscosity after three days, SAFT, and low temperature adhesion test results.

TABLE THREE

| | HMA-1 | HMA-2 | HMA-3 | HMA-4 | HMA-5 | HMA-6 | HMA-7 | HMA-8 | HMA-9 |
|---|---|---|---|---|---|---|---|---|---|
| Polymer A (density = 0.875 g/cm$^3$; I$_2$ = 246 g/10 min.) | 100 | 100 | 100 | 0 | 0 | 0 | 0 | 100 | 100 |
| Polymer B (density = 0.897 g/cm$^3$; melt viscosity at 177° C. = 5200 centipoise | 0 | 0 | 100 | 100 | 100 | 100 | 100 | 0 | 0 |
| Polymer C (density = 0.870 g/cm$^3$; melt viscosity at 177° C. = 355 centipoise) | 200 | 200 | 0 | 300 | 200 | 0 | 0 | 0 | 0 |
| Wax 1 (density = 0.968 g/cm$^3$; melt viscosity at 177° C. = 395 centipoise) | 0 | 0 | 0 | 0 | 0 | 30 | 30 | 0 | 0 |
| Polywax™ 2000 Wax | 33 | 33 | 22 | 0 | 0 | 0 | 0 | 0 | 0 |
| CP Hall 1246 Paraffinic Wax | 0 | 0 | 0 | 0 | 0 | 0 | 0 | 40 | 60 |
| Escorez™ E1310LC Tackifier | 33 | 66 | 22 | 0 | 100 | 40 | 0 | 0 | 0 |
| Piccotac™ 115 Tackifier | 0 | 0 | 0 | 0 | 0 | 0 | 0 | 40 | 60 |
| Irganox™ 1010 Antioxidant | 0 | 0 | 0 | 0 | 0 | 0.25 | 0.25 | 0.25 | 0.25 |

TABLE THREE-continued

|  | HMA-1 | HMA-2 | HMA-3 | HMA-4 | HMA-5 | HMA-6 | HMA-7 | HMA-8 | HMA-9 |
|---|---|---|---|---|---|---|---|---|---|
| Initial viscosity (cPs) | 2600 | 1570 | 1310 | 745 | 570 | 2020 | 2080 | 5700 | 2710 |
| Viscosity after 3 days (cPs) | 2440 | 1600 | 2200 | 2000 | 545 | 1900 | 1935 | 6050 | 3300 |
| SAFT (° F. (° C.)) |  |  | 184 (84) | 190 (87.8) |  |  | 230 (110) |  |  |
| Low temperature adhesion * | PT | PT | PT | PT | PT |  |  |  |  |

* PT indicates paper tear occurred.

EXAMPLES 10–15

HMA's Not Incorporating Tackifier

The following formulations are prepared at a polymer:wax ratio of 90:10 by weight. Polymer F was prepared as set forth above. The polymers employed in HMA-10, HMA-11, HMA-12, and HMA-13 were substantially linear ethylene/1-octene copolymers prepared in accordance with the procedures of U.S. Pat. No. 5,272,236. The wax used was Polywax™ 2000 ethylene homopolymer, available from Petrolite, Inc.

The samples were prepared by melting the components on a hot plate with stirring until a uniform mixture was obtained. The samples were allowed to cool.

Three small pieces of the polymer/wax samples were placed approximately ⅜ inch (1 cm) apart on the fiber side of a given paper board. The other piece of paperboard, coated side to sample, was placed on top. The structure was placed in a press, maintained at 180° C. for 15 seconds with approximately 500 psi (3.4 MPa) pressure, and was then removed and cooled. The HMA/paperboard structures were tested for paper tear.

A description of the HMA compositions, as well as the results of the paper tear test are set forth in Table Four.

TABLE FOUR

|  | HMA-10 | HMA-11 | HMA-12 | HMA-13 | HMA-14 | HMA-15 |
|---|---|---|---|---|---|---|
| Polymer density (g/cm$^3$) | 0.87 | 0.87 | 0.872 | 0.86 | 0.867 | 0.866 |
| Polymer melt index (I$_2$ (g/10 min.)) | 1 | 30 | 70 | 70 | 842 | 981 |
| Weight percent polymer | 90 | 90 | 90 | 90 | 90 | 90 |
| Weight percent wax | 10 | 10 | 10 | 10 | 10 | 10 |
| Paper-to-clay adhesion--Weyerhaeuser board* | No | No | Yes | Yes | Yes | Yes |
| Paper-to-clay adhesion--SARAN box (Cascade Industries, Canada)* | No | No | Yes | Yes | Yes | Yes |
| Paper-to-clay adhesion Mead paperboard* | No | No | Yes | Yes | Yes | Yes |

*A "yes" result means that paper tear was observed upon separating the paperboard/HMA/paperboard laminate; a "no" result means that no paper tear was observed upon separation.

EXAMPLES 16–24

Evaluation of HMA's for SAFT

The formulations set forth in Table Five were prepared, with Polymers A, B, D, and E, and Waxes 2, 3, and 4 being prepared by the procedures set forth above. The resultant hot melt adhesives were applied to 20 point paperboard boxes such as are employed in the packaging of rolls of food packaging film, for example SARAN-WRAP™ (trademark of The Dow Chemical Company), and to a cardboard such as is employed in cartons for packaging the 20 point paperboard boxes in case-size quantities.

The formulations, as well as representative properties thereof, are set forth in Table Five.

TABLE FIVE

|  | HMA-16 | HMA-17 | HMA-18 | HMA-19 | HMA-20 | HMA-21 | HMA-22 | HMA-23 | HMA-24 |
|---|---|---|---|---|---|---|---|---|---|
| Polymer A (density = 0.875 g/cm$^3$; I$_2$ = 246 g/10 min.) | 100.0 | 0 | 0 | 0 | 0 | 0 | 0 | 0 | 0 |
| Polymer B (density = 0.897 g/cm$^3$; melt viscosity at 177° C. = 5200 centipoise) | 0 | 100.0 | 0 |  |  |  |  | 0 |  |
| Polymer D (density = 0.883 g/cm$^3$; melt viscosity at 177° C. = 5000 centipoise) | 0 | 0 | 100.0 | 0 | 0 | 0 | 0 | 0 | 0 |

TABLE FIVE-continued

|  | HMA-16 | HMA-17 | HMA-18 | HMA-19 | HMA-20 | HMA-21 | HMA-22 | HMA-23 | HMA-24 |
|---|---|---|---|---|---|---|---|---|---|
| Polymer E (density = 0.893 g/cm$^3$; melt viscosity at 177° C. = 12,500 centipoise) | 0 | 0 | 0 | 0 | 0 | 0 | 0 | 100.0 | 0 |
| Polymer F (density = 0.893 g/cm$^3$; melt viscosity at 177° C. = 4000 centipoise) | 0 | 0 | 0 | 100.0 | 100.0 | 100.0 | 100.0 | 0 | 100.0 |
| Polywax ™ 2000 Wax | 115.0 | 0 | 0 | 0 | 0 | 0 | 0 | 0 | |
| CP Hall 1245 Paraffinic Wax | 0 | 0 | 0 | 20.0 | 20.0 | 0 | 0 | 0 | 0 |
| Wax 2 (density = 0.948 g/cm$^3$; melt viscosity at 177° C. = 350 centipoise) | 0 | 40.0 | 0 | | 0 | 0 | 0 | 0 | 0 |
| Wax 3 (density = 0.960 g/cm$^3$; melt viscosity at 177° C. = 512 centipoise) | 0 | 0 | 60.0 | 0 | 0 | 0 | 0 | 0 | 0 |
| Wax 4 (density = 0.937 g/cm$^3$; melt viscosity at 177° C. = 400 centipoise) | 0 | 0 | 0 | 40.0 | 40.0 | 100.0 | 80.0 | 80.0 | 80.0 |
| Escorex ™ E1310 Tackifier | 115.0 | 0 | 0 | 0 | 0 | 0 | 0 | 0 | 0 |
| Foral ™ 105 Tackifier | 0 | 40.0 | 40.0 | 40.0 | 40.0 | 80.0 | 0 | 0 | 0 |
| Piccotac ™ 115 | 0 | 0 | 0 | 0 | 0 | 0 | 50.0 | 50.0 | 50.0 |
| Kaydol ™ Mineral Oil | 0 | 0 | 0 | 0 | 10.0 | 0 | 0 | 0 | 20.0 |
| Irganox ™ 1010 antioxidant | 0.7 | 0.4 | 0.4 | 0.4 | 0.4 | 0.6 | 0.5 | 0.5 | 0.5 |
| 100g SAFT 20pt paperboard (° C.) | 120 | 125 | 120 | 95 | 105 | 110 | 110 | 110 | 110 |
| 100g SAFT cardboard (° C.) | 120 | 130 | 120 | 105 | 105 | 110 | 110 | 110 | 110 |
| Close time (seconds) | <5 | <5 | <5 | <5 | <10 | <5 | <5 | <5 | <5 |
| Open time (seconds) | 25 | 20 | 25 | 30 | 25 | 35 | 25 | 20 | 30 |
| Viscosity of Hot Melt Adhesive 177° C. (centipoise) | 1030 | 1940 | 1422 | 1037 | 758 | 865 | 1275 | 2740 | 942 |
| Viscosity of Hot Melt Adhesive after 3 days (centipoise) | 995 | 1895 | 1467 | 920 | N/D | 800 | N/D | 2850 | 930 |

N/D = not determined

Hot Melt Adhesive Formulations for Bonding Polyolefins

The hot melt adhesive formulation HMA-22, described in Table Five, was used to demonstrate the ability of the hot melt adhesives of the invention in the bonding of polyolefin substrates. Several 6 inch (15.2 cm) by 1 inch (2.5 cm) by 0.115 inch (0.292 cm) test coupons were cut from compression molded plaques of substantially linear ethylene/1-octene interpolymers available from The Dow Chemical Company as Affinity SM 1300 (having a density of 0.902 g/cm$^3$ and a melt index ($I_2$) of 30 g/10 minutes) and Affinity SM-8400 (having a density of 0.870 g/cm$^3$ and a melt index ($I_2$) of 30 g/10 minutes).

In the first experiment, the surface of the coupons of Affinity SM 1300 was heated to 80° C., and the surface of the coupons of the Affinity SM 8400 was heated to 60° C. by heating in convection ovens for 20 minutes, or until the specimens were brought into thermal equilibrium with the oven environment. Likewise, HMA-22 was melted and stabilized to 392° F. (200° C.) in a hot glue gun. The HMA-22 was quickly dispensed onto the surface of the preheated coupons. One of each type of coupon was pressed together by applying light finger pressure, and were immediately further pressed by application of 5 pounds (2.2 kg) force using a 5 pound (2.2 kg) roller. The composites were allowed to cool to room temperature.

In the second experiment, the first experiment was repeated, except that the coupons were not preheated, and the like, the hot melt adhesive HMA-22 was dispensed at 392° F. (200° C.) onto coupons which were maintained at room temperature.

The bonded coupons were tested by peeling by hand. The specimens of the first experiment exhibited very good adhesion. In all cases, the samples failed by the Affinity SM 8400 layer failing in the tensile mode. The specimens of the second experiment showed a mixed mode of adhesion, as both adhesive and cohesive failures were present at the same time on most test coupons. The results were verified by performing T-peel testing on remaining test coupons. The bonded coupons of the first experiment exhibited an average T-peel strength of 21.4±2.2 pounds/linear inch (24.7±2.5 kg/cm). The bonded coupons of the second experiment exhibited an average T-peel strength of 14.7±0.9 pounds/linear inch (17.0±1 kg/cm).

Hot Melt Adhesive Formulations of Ethylene/α-Olefins with Ethylene Acrylic Acid and Ethylene Vinyl Acetate The polymers, tackifier, wax, and antioxidant were simultaneously added in the indicated amounts to a Haake Rheocord 40 mixer using a 200 g mixing bowl maintained at about 130° C. at 95 revolutions per minute. The ingredients were mixed for about 5 minutes, until they became molten.

Ethylene acrylic acid (EAA) 5990 is commercially available from The Dow Chemical Company. Ethylene vinyl acetate (EVA-Elvax 210; 28 percent VA, 200 g/10 min. melt index) is commercially available from E. I. duPont de Nemours Company. Viscosity, viscosity after 3 days, open and close times, 500 gram SAFT, 100 gram SAFT, 100 gram PAFT and low temperature mandrel tests were performed as set forth above.

Sample HMA 25 is formulated from 100.0 phr of a homogeneous ethylene/1-octene interpolymer having a density of 0.890 g/cc and a melt viscosity at 350° F. (177° C.) of 5000 centipoise, 30.0 phr of a homogeneous ethylene homopolymer having a density of 0.960 g/cc and a melt viscosity at 350° F. (177° C.) of 300 centipoise, 40.0 phr of Foral™ 105 tackifier, 0.3 phr of Irganox™ 1010 antioxidant, and 18.9 phr Primacor™ 5990 ethylene acrylic acid copolymer. The formulation has a melt viscosity at 350° F. (177° C.) of 2775 centipoise, a close time of 5 seconds, an open time of 10 seconds, a 100 gram SAFT of 100° C., a 500 gram SAFT of 115° C., a PAFT of 115° C., and a low temperature mandrel test which indicates ¼ partial paper fail of Container Corporation of America.

Sample HMA 26 is formulated from 100.0 phr of a homogeneous ethylene/1-octene interpolymer having a density of 0.890 g/cc and a melt viscosity at 350° F. (177° C.) of 5000 centipoise, 30.0 phr of a homogeneous ethylene homopolymer having a density of 0.960 g/cc and a melt viscosity at 350° F. (177° C.) of 300 centipoise, 40.0 phr of Foral™ 105 tackifier, 0.3 phr of Irganox™ 1010 antioxidant, and 18.9 phr Elvax™ 210 EVA. The formulation has a melt viscosity at 350° F. (177° C.) of 3075 centipoise, a close time of 5 seconds, an open time of 10 seconds, a 100 gram SAFT of 100° C., a 500 gram SAFT of 120° C., a PAFT of 125° C., and a low temperature mandrel test which indicates ¼ partial paper fail of Container Corporation of America.

II. Hot Melt Pressure Sensitive Adhesive Examples

Preparation of Adhesive Formulations

The indicated polymer, tackifier, plasticizer, and antioxidant were simultaneously added in the indicated amounts to a Haake Rheocord 40 mixer using a 200 gram mixing bowl maintained at about 130° C. at 95 revolutions per minute. The ingredients were mixed for about 5 minutes, until they became molten.

Escorez™ 5300 petroleum hydrocarbon resin is a tackifier available from Exxon Chemical Company (Houston, Tex.). Escorez™ 5300 has a density of 1.09 g/cm³, a weight average molecular weight of 354, a number average molecular weight of 354, and an $M_w/M_n$ of 1.43.

Irganox™ B900 hindered phenolic antioxidant is available from Ciba-Geigy.

Irganox™ 1010 hindered phenolic antioxidant is available from Ciba-Geigy.

Polyisobutylene is available from Amoco.

Examples PSA-27 through PSA-32 were tested for initial viscosity and viscosity after three days, using a Brookfield viscometer at 350° F., probe tack, modulus (G'), and peak tan delta. The formulations and the measured properties are set forth in Table Six. Note that in the case of modulus and peak tan delta, the reported values were extracted from a computer-generated plot of the results.

As illustrated in Table Six, the adhesives of Examples 27, 29, 30, 31 and 32 meet the Dahlquist criteria, indicating their suitability as a traditional PSA, with Examples 27, 29, 30, and 31 further meeting the criteria that the glass transition temperature range from −20 to 20° C. Examples 27 and 28 illustrate the trend that as number average molecular weight decreases, storage modulus likewise decreases. Example 29 illustrates the use of added tackifier to increase the glass transition temperature of the formulation.

Dual molecular weight blends appear to offer a unique balance of properties which are not in accordance with the law of mixtures. In particular, while the blend of Example 31 has a storage modulus (G') at 25° C. which is intermediate that of Examples 27 and 28, the probe tack of Example 31 exceeded that of Example 28, indicating that the blends of the invention offer a synergistic behavior.

As further illustrated in Table Six, Example 27 may be employed as a cold temperature label or a PSA tape, Example 24 may be employed as a PSA tape, Example 30 may be employed as a low peel label or a freezer label; Example 31 may be employed in high peel labels or disposables applications; Example 32 may be employed in PSA tape.

TABLE SIX

|  | PSA-27 | PSA-28 | PSA-29 | PSA-30 | PSA-31 | PSA-32 |
|---|---|---|---|---|---|---|
| Polymer G (density = 0.867 g/cm³; $I_2$ = 842 g/10 min.) | 0 | 100/45.2 | 0 | 0 | 50/22.6 | 0 |
| Substantially linear ethylene/1-octene interpolymer (density = 0.864 g/cm³; $I_2$ = 13 g/10 min.) | 100/45.2 | 0 | 100/36.9 | 0 | 50/22.6 | 0 |
| Affinity ™ EG 8200 (0.870 g/cm³; $I_2$ = 5 g/10 min.) | 0 | 0 | 0 | 100/41.5 | 0 | 0 |
| Affinity ™ EG 8180 (0.863 g/cm³; $I_2$ = 0.5 g/10 min.) |  |  |  |  |  | 50/22.7 |
| Substantially linear ethylene/1-octene interpolymer (0.885 g/cm³; $I_2$ = g/10 min.) |  |  |  |  |  | 50/22.7 |
| Escorez ™ 5300 (Exxon) | 100/45.2 | 100/45.2 | 150/55.4 | 0 | 100/45.2 | 0 |
| Indopol ™ (Amoco) | 0 | 0 | 0 | 125/51.9 | 0 | 100/45.5 |
| Drakeol ™ 34 (Premcor) | 20/9.0 | 20/9.0 | 20/7.4 | 0 | 20/9.0 | 20/9.1 |
| Duoprime ™ 200 (Lyondell) | 0 | 0 | 0 | 15/6.2 | 0 | 0 |
| Irganox ™ B900 (Ciba Geigy) | 1/0.5 | 1/0.5 | 1/0.4 | 0 | 1/0.5 | 0 |
| Irganox ™ 1010 Antioxidant | 0 | 0 | 0 | 1/0.4 | 0 | 0 |
| Viscosity at 350° (cPs) |  |  |  |  |  |  |
| Probe tack (g) | 50 | 329 | 153 | 129 | 552 | 0 |
| G' at 0° C. (dynes/cm²(Mpa)) | $1.26 \times 10^7$ (1.26 MPa) | $1.26 \times 10^6$ (0.126 MPa) | $3.98 \times 10^7$ (3.98 MPa) | $1.78 \times 10^6$ (0.178 MPa) | $5.62 \times 10^6$ (0.562 MPa) | $5.01 \times 10^7$ (5.01 MPa) |
| G' at 25° C. (dynes/cm²) | $2.00 \times 10^6$ (0.200 MPa) | $3.98 \times 10^4$ (0.00398 MPa) | $1.41 \times 10^6$ (0.141 MPa) | $5.62 \times 10^3$ (0.0562 MPa) | $7.08 \times 10^5$ (0.0708 MPa) | $5.89 \times 10^6$ (0.589 MPa) |
| G' at 50° C. (dynes/cm²) | $3.16 \times 10^5$ ((0.0316 MPa) | NA | $1.78 \times 10^5$ (0.0178 MPa) | $1.58 \times 10^5$ (0.0158 MPa) | $3.16 \times 10^4$ (0.00316 MPa) | $2.24 \times 10^6$ (0.224 MPa) |
| G' at 75° C. (dynes/cm²) | $2.00 \times 10^4$ (2.00 kPa) | NA | $1.58 \times 10^4$ (1.58 kPa) | $7.08 \times 10^3$ (0.708 kPa) | $3.98 \times 10^3$ (0.398 kPa) | $2.51 \times 10^5$ (25.1 kPa) |
| Temp. at which G' = $10^4$ dynes/cm² (10 kPa) (° C.) | 90 | 32 | 79 | 74 | 57 | 90 |
| Temp. at which G' = $10^5$ dynes/cm² (100 kPa) (° C.) | 59 | 21 | 55 | 55 | 43 | 147 |
| Peak tan delta (° C.) | −12 | −21 | 0 | −55 | 17 | 0 |

Likewise, pressure sensitive adhesives may be prepared using a substantially linear ethylene polymer in combination with tackifier and a high density polyethylene having a lower molecular weight as indicated by a melt index ($I_2$) of 25 g/10 min. As set forth in the following Table Seven, such pressure sensitive adhesives exhibit probe tack values comparable to the adhesive used on Scotch™ magic tape (368 g).

TABLE SEVEN

|  | PSA-33 | PSA-34 |
|---|---|---|
| Substantially linear ethylene/1-octene interpolymer (density = 0.855 g/cm³; $I_2$ = 1 g/10 min) | 17.4 percent | 17.4 percent |
| HDPE 2455 (density = 0.955 g/cm³, $I_2$ = 25 g/10 min) | 7.5 percent |  |
| Affinity ™ SM 1300 (density = 0.902 g/cm³; $I_2$ = 30 g/10 min) |  | 7.5 percent |
| Escorez ™ 1310LC (Exxon) | 54.9 percent | 54/9 percent |
| Kaydol ™ (Witco) | 20.7 | 20.7 |
| Irganox ™ 1010 Antioxidant | 0.25 | 0.25 |
| Viscosity at 350° F. (177° C.) (cPs) | 42,000 | 24,650 |
| Probe tack (g) | 537 | 264 |

III. Application Specific Adhesive Examples

The following examples were made using a sigma blade mixer or a vertical upright mixer with standard hot melt blending techniques and tested in accordance with the test methods described above. Unless indicated otherwise, the homogeneous ethylene/α-olefin interpolymers utilized in the examples are depicted in the following Table Eight. The presentation of the examples in this manner is a matter of convenience and is in no way intended to be limiting. Adhesive examples targeted for specific end-use applications also have utility for other applications.

TABLE EIGHT

| Supplier | Designation | Melt Index ($I_2$ in g/10 min) | Density (g/cm³) | Comonomer |
|---|---|---|---|---|
| Exxon | Exxpol SLP-0380 | 20 | 0.865 | Propylene |
| Exxon | Exxpol SLP-0394 | 5 | 0.865 | Propylene |
| Exxon | Exxpol SLP-0397 | 120 | 0.885 | Propylene |
| Exxon | Exxpol SLP-0527 | 125 | .901 | Butene |
| Exxon | Exxpol SLP-0592 Exact 5008 | 10 | 0.865 | Butene |
| Exxon | Exxpol SLP-0599 | 20 | 0.865 | Butene |
| Exxon | Exxpol SLP-0173 | 3.5 | .910 | Hexene |
| Exxon | Exxpol SLP-0728 Exact 3031 | 3.5 | .900 | Hexene |
| Dow | SM-1300 | 30 | .902 | Octene |
| Dow | SM-8400 | 30 | .870 | Octene |
| Dow | EG-8150 | 0.5 | .870 | Octene |
| Dow | EG-8200 | 5 | .870 | Octene |
| Dow | EG-8100 | 1 | .870 | Octene |
| Dow | SM1250 | 30 | .885 | Octene |
| Dow | DPF 1150-01 | 0.9 | .901 | Octene |
| Dow | *EIP 4 | 28 | .868 | Octene |
| Dow | EIP 5 | 1 | .858 | Octene |
| Dow | EIP 6 | 30 | .855 | Octene |
| Dow | EIP 7 | 200 | .870 | Octene |
| Dow | EIP 8 | 100 | .900 | Octene |
| Dow | EIP 9 | 100 | .855 | Octene |
| Dow | EIP 10 | **5000 cps | .870 | Octene |
| Dow | EIP 11 | **5000 cps | .890 | Octene |
| Dow | LDPE 959S | 60 | .920 | Octene |

EIP-Experimental Substantially Linear Ethylene/1-Octene Interpolymer;
*In-reactor mixture;
**Brookfield Viscosity (MI not measurable)

TABLE EIGHT A

| Other Ingredients | | |
|---|---|---|
| Tradename | Description | Supplier |
| Tackifying Resins | | |
| Escorez 2520 | $C_5/C_9$ hydrocarbon blend | Exxon |
| Escorez 5400 (ECR-177) | hydrogenated dicyclopentadiene | Exxon |
| Escorez 2520 | $C_5/C_9$ hydrocarbon blend | Exxon |
| Escorez 2520 | $C_5$ hydrocarbon | Exxon |
| Eastotac H-100 | hydrogenated $C_9$ | Eastman |
| Eastotac H-130 | hydrogenated $C_9$ | Eastman |
| Sylvatac 1103 | rosin ester | Arizona |
| Plasticizers | | |
|  | *500 napthenic oil | Penzoil |
|  | *1200 napthenic oil | Penzoil |
| Kaydol | white mineral oil | Witco |
| Parapol 1300 | 1300 $M_w$ polybutene | Exxon |
| Benzoflex 352 | 1,4 cyclohexane dimethanol dibenzoate | Velsicol |
| Waxes | | |
| Victory® Amber Wax | *160° F. Microwax | Petrolite |
| Castorwax | hydrogenated castor oil | Caschem |
| Okerin® 236 TP | parafin 155° F. | Astor Wax |
| Paraflint H4 (*HMP Wax) | 225° F. Fischer Tropsch | Moore & Munger |
| Besquare® 195 | 195° F. Microwax | Petrolite |
| Bareco PX-100 | 225° F. Fischer Tropsch | Bareco |
| Modifying Polymers | | |
| Kraton® G-1657 | 13 percent styrene, 35 percent diblock styrene-ethylene-butylene-styrene block copolymer | Shell |
| Elvax 260 | 28 percent vinyl acetate, 5 melt index | Dupont |
| Elvax 150 | 33 percent vinyl acetate, 44 melt index | Dupont |
| Elvax 410 | 18 percent vinyl acetate, 500 melt index | Dupont |
|  | *EnBA 35 percent BA, 320 melt index | |
| HL-2660 | Polyamide | H. B. Fuller Co. |
| HL-6088 | Polyamide | H. B. Fuller Co. |
| Petrothene NA 601 | .903 g/cm³, 2000 melt index low density polyethylene | Petrolite |
| Epolene C-15 | .906 g/cm³, 4200 melt index polyethylene | Eastman |
| Irganox 1010 | hindered phenol antioxidant | Ciba-Giegy |

*Description rather than tradename indicated in the examples.

Nonwoven Construction Adhesives

Adhesives of the invention for use as nonwoven contruction adhesives are set forth below in Tables Nine and Nine A.

Examples 35–57 of Table Nine represents nonwoven construction adhesives useful for the assembly of various disposable articles such as disposable diapers, sanitary napkins, surgical gowns, and the line wherein a body fluid impermeable backsheet is typically bonded to a nonwoven substrate. The disposable article of the present invention comprises at least two layers wherein at least one of said layers is a body fluid impermeable barrier and at least one of said second layers is a body fluid permeable cover; wherein at least one layer is attached to at least one other layer by the adhesive composition of the present invention. The disposable article may also optionally contain at least one layer or material selected form the group consisting of absorbents, tissues, elastomeric materials, superabsorbent polymers, and combinations thereof. The body fluid cover is typically a polyolefin film, such as polyethylene, polypropylene, ethylene-vinyl acetate, and especially a homogeneous ethylene/α-olefin interpolymer film, provided as a roll good. Alternatively, the barrier layer can be made in-line by coating a thermoplastic composition to a carrier material such as a nonwoven. In-line film forming is of particular interest for materials which are unsuitable, due to tack, undesirable rheological properties, or any other constraint which renders the material undesirable for making prefinished roll goods. Preferably, in-line barriers are made using a noncontact slot coat application method described in detail in H.B. Fuller's copending PCT application, Application No. EP 96/00377 filed Jan. 30, 1996.

The majority of the adhesives examples are pressure sensitive in nature. However, some of the examples, particularly those comprising Benzoflex 352 or alternatively relatively high concentrations of the homogeneous ethylene/α-olefin interpolymer, and the like, greater than about 40 weight percent of the homogeneous ethylene/α-olefin interpolymer, are relatively tack-free upon cooling. Examples NW-44 and NW-45 are substantially tack-free upon cooling and are intended for nonwoven to nonwoven bonding. The bonds were made and evaluated in accordance with the previously mentioned "Fineline and Spray" test method. The application conditions and resulting peel results are recorded in Table Ten.

Surprisingly, as illustrated in Table Ten, these adhesive compositions have excellent spray properties and spray bond strengths, even though the viscosity at application temperature is significantly higher than a typical block copolymer based adhesive composition, such as HL-1280 (H.B. Fuller), an industry standard nonwoven construction adhesive for bonding polyolefin films. Although nonwoven construction adhesives are exemplified, the adhesives of the present invention are also surmised to be suitable for elastic attachment, frontal tape, as well as multipurpose nonwoven applications.

Polyolefin films comprising homogeneous ethylene/α-olefin interpolymers are becoming increasingly popular due to their reduced stiffness and improved tactile quality in comparison with conventional polyethylene films. The adhesives of the present invention are expected to exhibit even higher bond strength on films comprising homogeneous ethylene/α-olefin interpolymers.

TABLE NINE

| | Nonwoven Construction Adhesives | | | | | | | | | | | |
|---|---|---|---|---|---|---|---|---|---|---|---|---|
| Ingredient | 4156-77-1 NW-35 | 4156-80-1 NW-36 | 4156-78-1 NW-37 | 5179-10-1 NW-38 | 5402-42-1 NW-39 | 5402-4-1 NW-40 | HL-1624 NW-41 | HL-1617 NW-42* | HL-1625 NW-43* | NW-44 | NW-45 | 5338-57-2 NW-46 |
| SLP-0592 | 25.0 | | 25.0 | | | | | | | | | |
| SLP-0599 | | 25.0 | | | | | | | | | | |
| EIP 6 | | | | 17 | | | | | | | | |
| DPF-1150.01 | | | | 3 | | | | | | | | |
| XUR 5990100 | | | | | 22 | | | | | | | 20 |
| EIP 4 | | | | | | | | | | | | |
| EIP 7 | | | | | | 40 | | | | | | |
| EG 8200 | | | | | | | 16 | 12 | 12 | | | |
| 0.87 g/cm³/2200 MI** | | | | | | | | | | 50 | | |
| 0.86 g/cm³/200 MI** | | | | | | | | | | | 70 | |
| Escorez 2520 (Exxon) | 25.0 | 25.0 | | | | | | | | | | |
| Excorez 5320 (Exxon) | | | | | 55 | | | | | | | 55 |
| Escorez 5400 (Exxon) | 49.0 | 49.0 | 49.0 | 55 | | 50 | 55 | 56.8 | | 50 | 30 | |
| Escorez 2596 | | | | | | | | | 56.8 | | | |
| 500 Napthenic Oil | | | | | 23 | 10 | 27 | 28 | 28 | | | |
| Kaydol | | | | 25 | | | | | | | | 25 |
| Benzoflex 352 (Velsicol) | | | 25.0 | | | | | | | | | |
| Irganox 1010 | 1.0 | 1.0 | 1.0 | | | | | .2 | .2 | .2 | | |
| Viscosity @ 250° F. (cps) | 150,000 | 78,000 | 110,000 | | | | | 8,175 | 8,400 | | | |
| @ 275° F. (cps) | 81,000 | 42,000 | 65,000 | | | | 13,900 | 4,375 | 4,640 | | | |
| @ 300° F. (cps) | 48,000 | 24,500 | 40,000 | 7650 | | | 8,000 | 2,600 | 2,740 | | | |
| @ 325° F. (cps) | 29,500 | 15,000 | 25,000 | 5000 | 8425 | 3733 | 4,890 | 1,996 | 1,710 | | | 4395 |
| @ 325° F. (cps) | 19,000 | 9,375 | 17,500 | | | | 3.095 | | 1,135 | | | |

**Substantially linear ethylene/1-octene interpolymers available from The Dow Chemical Company; All amounts are in pph; Examples indicated by * further contain 2 weight percent Paraflint C-80

TABLE NINE-A

| Reference # | NW-47 | 5179-22-2 NW-48 | 5338-53-1 NW-49 | 5402-18-2 NW-50 | 5338-53-2 NW-51 | Comparative Example B |
|---|---|---|---|---|---|---|
| EIP 5 | | 10 | 6 | 14 | | |
| DPF 1150.01 | | | 6 | | | |
| EIP 4 | | | | | 25 | |
| Rextac 2385 (Rexene) | | | | | | 25 |
| EIP 10 | 30 | | | | | |
| EIP 11 | 30 | | | 6 | | |
| ECR 177 | | 65 | 60 | 62 | 55 | |
| Escorez 5320 | 40 | | | 18 | | 55 |
| Kaydol | | 25 | 23 | | 20 | 20* |
| Visc @ 300 F. | 4300 | | | | | 1025 |
| Visc @ 325 F. | | 3250 | 5500 | 20500 | 8813 | |

All amounts are as weight percent.
Comparative Example B indicated by * utilizes 500 Napthenic Oil in place of Kaydol oil

TABLE TEN

Nonwoven Construction Bonding Results

| Example | Adhesive Temperature (° F. (° C.)) | Air Pressure (psi (MPa)) | Spiral Spray Peel (g/lineal in. (g/cm)) | Fineline Peel (g/lineal in. (g/cm)) | Comments |
|---|---|---|---|---|---|
| NW-35 | 350 (177) | 30 (0.21) | 210 (40) | 340 (160) | Destructive Bonds |
| NW-36 | 300 (149) | 26 (0.18) | 190 (20) | 211 (40) | Destructive Bonds |
| NW-38* | 275 (135) | | 126 (12) | 55 (5) | Cohesive Failure, Low Application Temperature |
| NW-39 | 325 (163) | 28 (0.19) | 162 (19) | 203 (27) | Destructive Bonds |
| NW-40 | 300–325 (149–163) | | 116 (19) | 64 (7) | |
| NW-41 | 275–300 (135–149) | 15 (0.10) | 140 (55) | 125 | |
| NW-42 | 275 (135) | 6 (0.041) | 125 (49) | 115 | |
| NW-43 | 300 (149) | 7 (0.048) | 125 (49) | 115 | |
| NW-44 | 300 (149) | 7 (0.048) | 79 (9) | 123 (15) | |
| NW-45 | not tested | | | | |
| NW-46 | 325 (163) | 15 (0.10) | 142 (18) | 125 (18) | |
| NW-47 | 300 (149) | 12 (0.083) | 31 (7) | 82 (21) | |
| NW-48 | 300–325 (149–163) | | 107 (14) | 59 (10) | VerySoft |
| NW-49 | 300 (149) | | 151 (36) | 103 (17) | |
| NW-50 | 325 (163) | 15 (0.10) | 184 (32) | 235 (76) | Destructive Bonds |
| NW-51 | 325 (163) | | 129 (21) | 160 (51) | |
| Comparative B | 300 (163) | | 35 (20) | 6 (3) | |
| Comparative A-HL-1280 | 275 (135) | 15 (0.10) | 95** (37) | 175** (69) | (**running average) |

*NW-37 not tested

Thermal Stability Testing

The pressure sensitive adhesives of Examples NW-41 through NW-45 were tested for thermal stability. The results are set forth in the following Table Eleven. As is exemplified by these thermal stability results, the adhesives of the present invention exhibit tremendously improved viscosity stability relative to block copolymer based adhesive compositions.

TABLE ELEVEN

Thermal Stability Testing (Brookfield viscosity at 300° F. (149° C.) (cps))

| Viscosity | 0 | 24 hrs | 48 hrs | 72 hrs | 96 hrs | 200 hrs | Delta 96 | Delta 200 |
|---|---|---|---|---|---|---|---|---|
| HL1280 | 2645 | 2425 | 2310 | 2065 | 1990 | — | −25 | — |
| (HL-1624) NW-41 | 9950 | 9900 | 9825 | 10200 | 10350 | 10450 | 4.0 | 5.0 |
| (HL-1617) NW-42 | 2735 | 2540 | 2515 | 2650 | 2560 | 2750 | −6.4 | 0.5 |
| (5576-3-3) NW-43 | 9575 | 9550 | 9525 | 9475 | 9800 | 9400 | 2.3 | −1.8 |
| (HL-1625) NW-44 | 2300 | 2320 | 2130 | 2450 | 2440 | 2385 | 6.1 | 3.7 |

Positioning Adhesive

Positioning adhesives are typically pressure sensitive in nature and is sandwiched between the garment facing surface of a feminine napkin and release paper. Upon use the release paper is removed and the napkin is secured to an undergarment by means of the positioning adhesive. The current state of the art with respect to positioning adhesives can be found in U.S. Pat. Nos. 4,136,699, 5,149,741 and 4,704,110. Pressure sensitive adhesives for use as positioning adhesives, as well as representative performance attributes thereof, are set forth in the following Table Twelve.

TABLE TWELVE

| Positioning Adhesives | | | |
|---|---|---|---|
|  | 52 | 53 | 54 |
| SLP-0592 | 25.0 | 20.0 | 20.0 |
| SLP-0597 | 49.0 | 5.0 | 5.0 |
| Eastotac H-130 | 49.0 | 49.0 | — |
| ECR-177 | — | — | 49.0 |
| Kaydol Oil | 25.0 | 25.0 | 25.0 |
| Irganox 1010 | 1.0 | 1.0 | 1.0 |
| Initial T-Peel to Cotton (1 mil) | 365 g (5) | 298 g (16) | 172 g (23) |
| Initial T-Peel to Cotton (2 mil) | 478 g (19) | 406 g (13) | 216 g (26) |

(95 percent Confidence Intervals)

Additional PSA Applications

The adhesives of the invention may be utilized as adhesives for use in industries other than nonwoven and personal care items. For instance, Examples 55–58 represent packaging PSA formulations for bonding rigid polyolefin containers (lunch meat containers) and for bottle labeling applications. Examples 55–56 demonstrate the utility of employing block copolymers, particularly in small concentrations, in combination with the essential homogeneous ethylene/α-olefin interpolymer.

Example 59 represents an example of a "foam in place" gasket wherein the compositions serves a multipurpose of bonding, sealing, and gasketing.

Examples 60 and 61 represent rodent trap adhesives which are a substantial cost savings relative to existing technology. Typically, block copolymer-based adhesives for this application comprise from about 5 to about 20 percent by weight of the block copolymer. The adhesive composition covers the bottom surface of a container such as box and is subsequently baited to form a trap. Often an additive is incorporated directly into the adhesive which attracts rodents and eliminates the need for consumer-provided bait. The adhesive exhibits high tack and cohesive strength to restrain the rodent.

The various additional PSA examples, and representative performance attributes thereof, are set forth in the following Table Thirteen:

TABLE THIRTEEN

| Additional Pressure Sensitive Adhesive Examples | | | | | | | |
|---|---|---|---|---|---|---|---|
| Reference # Ingredient Trade name | (4230-44-1) Example 55 | (4230-40-1) Example 56 | (4230-39-1) Example 57 | (4230-39-2) Example 58 | (4156-80-2) Example 59 | (4231-1-1) Example 60 | (4231-1-2) Example 61 |
| SLP-0592 | 9.0 | 11.7 | 15.0 | 14.6 |  |  | 10.0 |
| SLP-0599 |  |  |  |  | 30.0 | 10.0 |  |
| Kraton ™ G-1657 (Shell) | 6.0 | 2.9 |  |  |  |  |  |
| Eastotac ™ H-100 (Eastman) | 42.5 | 41.5 | 42.5 | 41.5 |  |  |  |
| ECR-177 (Exxon) |  |  |  |  |  | 44.0 |  |
| Escorez ™ 1310 (Exxon) |  |  |  |  |  |  | 44.0 |
| 500 Oil (Naphthenic) | 37.5 | 39.0 | 40.0 | 39.0 |  |  |  |
| 1200 Oil (Naphthenic) |  |  |  |  |  | 45.0 | 45.0 |
| Kaydol Oil |  |  |  |  | 40.0 |  |  |
| Microwax 160 | 5.0 | 4.9 |  |  |  |  |  |
| Castor Wax |  |  | 2.5 | 4.9 |  |  |  |
| Parafin 155 |  |  |  |  | 30.0 |  |  |
| Irganox 1010 |  |  |  |  |  | 1.0 | 1.0 |
| Viscosity @ 250° F. (121° C.) |  | 6275 cps |  |  |  |  |  |
| @ 275° F. (135° C.) |  | 3810 |  |  |  |  |  |
| @ 300° F. (149° C.) |  | 2415 |  |  |  |  |  |
| @ 325° F. (163° C.) |  | 1600 |  |  |  |  |  |
| @ 350° F. (177° C.) |  | 1112 |  |  |  |  |  |

All percentages are by weight percent

Adhesive Formulations Comprising Homogeneous Ethylene/α-Olefin Interpolymers and EVA:

The adhesives of the invention may further include, in additional to the homogeneous ethylene/α-olefin interpolymer, one or more ethylene vinyl acetate copolymers. In particular, given the compatibility of homogeneous ethylene/α-olefin interpolymers with EVA, adhesives comprising such a combination of polymers will find utility in, for instance, bookbinding applications as well as others where it is necessary for the hot melt adhesive to lose surface tack quickly after application to insure that the adhesive does not build up on the trimmer knives. Also, this compatability faciliates the need to adjust the set time to accommodate various application equipment. Representative of such hot melt adhesive formulation comprising EVA which has from 18 to 33 weight percent vinyl acetate content, as well as representative performance attributes thereof, are set forth in the following Table Fourteen:

As exemplified in Tables Sixteen A and B, for bookbinding applications it is preferred to employ a homogeneous ethylene/α-olefin interpolymer having a density of 0.870 $g/cm^2$ or less and a relatively low melt index, for example ranging from 10 to 20 g/10 min., at concentrations of 30 weight percent or less. To reduce the viscosity of the adhesive composition it is preferable to blend a second homogeneous ethylene/α-olefin interpolymer having a melt index ranging from 100 to 2000 g/10 min. in combination with the low melt index homogeneous ethylene/α-olefin interpolymer. It is a surprising result that adhesives can be prepared with this low density homogeneous ethylene/α-olefin interpolymer without sacrificing heat resistance. Microwaxes are preferred waxes for bookbinding applications, particularly when combined with polar tackifiers such as rosin esters, rosin acids, hydrogenated rosin esters, terpene resins, styrenated terpenes, terpene phenolics, and mixtures thereof.

TABLE FOURTEEN

| Reference # Trade Name Ingredient | 4036-41-1 Example 62 | 4036-41-2 Example 63 | 4036-41-3 Example 64 | 4036-41-4 Example 65 | 4036-41-5 Example 66 | 4036-41-6 Example 67 | 4036-41-7 Example 68 |
|---|---|---|---|---|---|---|---|
| SLP-0380 | 40.0 | 40.0 | 40.0 | 40.0 | 30.0 | 30.0 | 30.0 |
| Eastotac H-100 | 39.5 | 39.5 | 39.5 | 39.52 | 59.5 | 59.5 | 59.5 |
| Parafin 155 | 20.0 | | | | | | |
| Irganox 1010 | .5 | .5 | .5 | .5 | .5 | .5 | .5 |
| Elvax 260 (28 percent vinyl acetate) | | 20.0 | | | 10.0 | | |
| Exvax 150 (33 percent vinyl acetate) | | | | 20.0 | | 10.0 | |
| Elvax 410 (18 percent vinyl acetate | | | 20.0 | | | | 10.0 |

All amounts are in weight percent.

Bookbinding Adhesives

Certain of the claimed adhesives will find particular utility in the graphic arts industry as bookbinding adhesives. The target property ranges set forth in the following Table Fifteen can be achieved with the adhesives of the invention.

TABLE FIFTEEN

| | Target Bookbinding Properites | | | | |
|---|---|---|---|---|---|
| | Viscosity at 350° F. | 100 g Peel | Cold Crack | Ambient Range* | Tensile |
| Useful | ≦10,000 cps | ≧120° F. (49° C.) | ≦40° F. (4.4° C.) | ≧80° F. (27° C.) | ≧350 psi (2.4 MPa) |
| Good | <8,000 cps | >130° F. (54° C.) | <30° F. (−1° C.) | >100° F. (38° C.) | >500 psi (3.4 MPa) |
| Excellent | <6,000 cps | >140° F. (60° C.) | <20° F. (−7° C.) | >120° F. (49° C.) | >600 psi (4.1 MPa) |

*The ambient ranges is defined as the difference between the 100 g peel and the cold crack.

Representative bookbinding adhesives and representative performance attributes thereof are set forth in the following Tables Sixteen A and B.

TABLE SIXTEEN A

Bookbinding Adhesives

| Ingredient | 4036-43-1 Example 69 | 4036-43-2 Example 70 | 4036-49-1 Example 71 | 4036-49-2 Example 72 | 4036-49-3 Example 73 | Example 74 | Example 75 | Example 76 | Example 77 |
|---|---|---|---|---|---|---|---|---|---|
| SLP-0380 | 40.0 | 35.0 | 40.0 | 20.0 | | 15.0 | 15.0 | | |
| SLP-0397 | | | | 20.0 | 40.0 | 20.0 | 20.0 | | |
| SLP-0527 | | | | | | | | 25.0 | 20.0 |
| SLP-0592 | | | | | | | | 10.0 | 15.0 |
| Eastotac H-100 | 39.5 | 39.5 | 34.5 | 34.5 | 34.5 | 44.5 | | 44.5 | 44.5 |
| Eastotac H-130 | | | | | | | 44.5 | | |
| HMP Wax (Fischer Tropsch, 225 mp) | 20 | 25.0 | 12.5 | 12.5 | 12.5 | 20.0 | 20.0 | 20.0 | 20.0 |
| Irganox 1010 | .5 | .5 | .5 | .5 | .5 | .5 | .5 | .5 | .5 |
| Paraffin 155 | | | 12.5 | 12.5 | 12.5 | | | | |
| PAFT (° F. (° C.)) | 140 (60) | 138 (59) | 112 (44) | 112 (44) | 105 (41) | 128 (53) | 139 (59) | 141 (61) | 147 (64) |
| SAFT (° F.) | 193 (89) | 194 (90) | 173 (78) | 173 (78) | 174 (79) | 192 (89) | 191 (88) | 199 (93) | 197 (92) |
| Cold Crack (° F.) | 10 (−12) | 20 (−7) | 5 (−15) | 15 (−9) | 25 (−3.9) | 20 (−7) | 30 (−1) | 45 (7.2) | 30 (−1) |
| Ultimate Tensile (psi) | | | | 510 (3.4 MPa) | | | 526 | 697 (4.8 MPa) | 606 (4.1 MPa) |
| Viscosity @ 350° F. (177° C.) (cps) | 32,000 | 20,100 | 26,200 | 14,500 | 6,675 | 10,350 | 11,800 | 8562 | 12,875 |

All amounts are by weight percent.

TABLE SIXTEEN B

Bookbinding Adhesives

| Ingredient | Example 78 | Example 79 | Example 80 | Example 81 | Example 82 | Example 83 | Example 84 | Example 85 |
|---|---|---|---|---|---|---|---|---|
| 0.87 g/cm³/I$_2$ = 10 g/10 min** | 14 | | | | | | | |
| 0.864 g/cm³/I$_2$ = 14 g/10 min** | 14 | 22.5 | 25 | 25 | 25 | 25 | 25 | 20.5 |
| 0.873 g/cm³; I$_2$ = 2200 g/10 min** | | 10 | | | | | | |
| 0.864 g/cm³; Melt viscosity at 177° C. = 10000 cps*** | | | 10 | 10 | 10 | 10 | 10 | 15 |
| Parafling H4 | 25 | 25 | | | | | | 11 |
| Escorez 5400 | 46.5 | | | | | | | 21 + 21* |
| Eastatac H-100-R | | 42.5 | 39.5 | 29.5 | 24.5 | 20 | | |
| 195° F. Microwax | | | 25 | 25 | 25 | 25 | 25 | 11 |
| Nirez 2019 | | | | 10 | 15 | 19.5 | 39.5 | |
| Irganox 1010 | .2 | .5 | .2 | .2 | .2 | .2 | .2 | .5 |
| Irganox 1076 | .3 | | .3 | .3 | .3 | .3 | .3 | |
| Cold Crack (° F. (° C.)) | 25 (−3.8) | 10 (−12) | −5 (−21) | 0 (−18) | 5 (−15) | 5 (−15) | 5 (−15) | 10 (−12) |
| Ambient Range (° F.(° C.) | 115.6 (46) | 132 (56) | 138 (59) | 139 (59) | 132.5 (56) | 128.5 (54) | 127 (53) | 128 (53) |

TABLE SIXTEEN B-continued

Bookbinding Adhesives

| Ingredient | Example 78 | Example 79 | Example 80 | Example 81 | Example 82 | Example 83 | Example 84 | Example 85 |
|---|---|---|---|---|---|---|---|---|
| 100 g Peel (° F.(° C.)) | 140 (60) | 142 (61) | 133 (56) | 139.2 (60) | 137.5 (59) | 133.8 (57) | 132 (56) | 138 (59) |
| Viscosity @ 350° F. | 9250 | 4750 | 7215 | 7325 | 7825 | 7625 | 7440 | 5900 |
| Ultimate Tensile (psi(Mpa)) | 591 (4.07) | 561 (3.87) | 369 (2.54) | 403 (2.78) | 408 (2.81) | 429 (2.96) | 542 (3.74) | 366 (2.52) |

*Escorez 5615
**Substantially linear ethylene/1-octene interpolymers; homogeneous ethylene/1-octene interpolymer (all available from The Dow Chemical Company)
All amounts are reported in weight percent.

Case and Carton Seal Adhesive

The hot melt adhesives of the invention will find particular utility as case and carton seal adhesives. Representative adhesives for case and carton sealing, and representative performance attributes thereof, are set forth in the following Table Seventeen. Table Seventeen illustrates the utility of blending small concentrations of the homogeneous ethylene/α-olefin interpolymer with a second polyethylene, resulting in improved cold temperature properties and heat resistance.

TABLE SEVENTEEN

Case and Carton Seal Adhesives

| | 4056-43-1 Example 53 | 4056-46-1 Example 54 | 4056-60-1 Example 55 | 4056-65-1 Example 56 | 4056-65-2 Example 57 | 4056-65-3 Example 58 | 4056-65-4 Example 59 | HL 7400 |
|---|---|---|---|---|---|---|---|---|
| Eastotac H-100 (Eastman) | 50 | 50 | 35 | 35 | 35 | 35 | 35 | 30 |
| SLP-0599 | 12 | | | | 10 | | | |
| SM-8400 | | | 10 | | | | | |
| SLP-0380 | | | | 10 | | | | |
| SLP-0738 | | | | | | 10 | | |
| Epolene C-15 (Eastman) | 20 | 32 | 50 | 50 | 50 | 50 | 60 | |
| Paraflint H-4 | 18 | 18 | 5 | 5 | 5 | 5 | 5 | |
| Petrothene NA601 | | | | | | | | 70 |
| Viscosity @ 350° F. (177° C.) (cPs) | 1325 | 1800 | 2025 | 2900 | 2800 | 7600 | 730 | 2025 |
| Bonding Testing Corrugated: | | | | | | | | |
| Room Temp | 1 | 4 | 1 | 1 | 1 | 1 | 1 | 1 |
| 40° F. (4.4° C.) | 2 | 4 | 1 | 1 | 1 | 1 | 4 | 4 |
| 0° F. (−18° C.) | 4 | 4 | 1 | 3 | 3 | 1 | 4 | 4 |
| PAFT (° F. (° C.)) | 147 (64) | 88 (31) | 138 (59) | 120 (49) | 130 (54) | 138 (59) | 110 (43) | 105 (41) |
| SAFT (° F. (° C.)) | 192 (89) | 197 (92) | 190 (88) | 190 (88) | 190 (88) | 190 (88) | 190 (88) | 197 (92) |

All amounts are reported in weight percent.
1 = Full Fiber Tear
2 = Shallow Fiber Tear
3 = Partial Fiber Tear
4 = No Fiber Tear
HL 7400, Commercial Case and Carton Seal (HB Fuller)

Packaging Adhesives

The hot melt adhesives of the invention will find utility in a variety of packaging applications. Their success in such applications is attributable in part to the fact that by employing the essential homogeneous ethylene/α-olefin interpolymer, a good balance of heat resistance (PAFT/SAFT) and cold temperature properties can be achieved. The following Tables Eighteen A, B, and C report a variety of adhesive compositions intended for various packaging applications, as well as various performance attributes thereof.

As illustrated in Tables Eighteen A, B, and C, for high performance packaging applications, the homogeneous ethylene/α-olefin interpolymer employed will have a density of 0.87 g/cm$^3$ or less, and a melt index ($I_2$) of about 500 g/10 min. or less, and will be employed at concentrations of about 30 to 45 weight percent. Preferably, the homogeneous ethylene/α-olefin interpolymer will be provided in combination with from 25 to 45 weight percent of high melt point wax, and from 20 to 50 weight percent of a high melt point resin. Example 101 demonstrates the compatability of the homogeneous ethylene/alpha-olefin interpolymer with EnBA. This combination is surmised to be useful for further improving the low temperature adhesion and thermal stability as well as improve the compatability with non-polar tackifying resins.

TABLE EIGHTEEN A

Packaging Adhesives

| | 5342-56-1 Example 86 | 5342-56-2 Example 87 | 5342-56-3 Example 88 | 5342-56-4 Example 89 | 5342-56-5 Example 90 | 5342-60-1 Example 91 | 5342-60-2 Example 92 | 5342-60-3 Example 93 |
|---|---|---|---|---|---|---|---|---|
| Dow SM-8400 | 20 | 20 | 22.5 | 22.5 | 18 | 20 | 20 | 18 |
| Paraflint H-4 | 20 | 25 | 20 | 25 | 17 | 15 | 10 | 10 |
| Eastotac H-100 | 60 | 55 | 57.5 | 52.5 | 65 | 65 | 70 | 72 |
| Irganox 1010 | .25 | .25 | .25 | .25 | .25 | .25 | .25 | .25 |
| Viscosity @ 350° F. (177° C.) (cPs) | 151 | 1270 | 2280 | 1140 | 2315 | 1865 | 2705 | — |
| PAFT (° F. (° C.)) | 158.5 (70) | 159 (71) | 152 (67) | 157.8 (70) | 153.8 (68) | 163 (73) | 153.7 (68) | 153 (67) |
| SAFT (° F. (° C.)) | 188.2 (87) | 192.8 (89) | 192.6 (89) | 199.8 (93) | 185.8 (85) | 186.4 (86) | 170.4 (77) | 160.8 (72) |
| Bonding Testing*: | | | | | | | | |
| 70° F. (21° C.) Clay Coat Surface | 100 percent | 100 percent | 100 percent | 100 percent | 100 percent | 100 percent | 100 percent | 100 percent |
| Uncoated Surface | 85 percent | 98 percent | 98 percent | 75 percent | 100 percent | 83 percent | 80 percent | 10 percent |
| 30° F. (−1° C.) Clay Coat Surface | 100 percent | 100 percent | 100 percent | 100 percent | 100 percent | 100 percent | 100 percent | 100 percent |
| Uncoated Surface | 0 percent | 100 percent | 100 percent | 15 percent | 70 percent | 50 percent | 5 percent | 0 percent |

All amounts are reported in weight percent.
*Adhesion to MEAD Carrier-kote (high wet strength), Average of two bonds - percent fiber tear

TABLE EIGHTEEN B

Packaging Adhesives

| Reference # | 5342-521 Ex. 94 | 5342-52-2 Ex. 95 | 5342-52-3 Ex. 96 | 5342-52-4 Ex. 97 | 5342-53-1 Ex. 98 | 5342-53-2 Ex. 99 | 5709-26-1 Ex. 100 | 5709-26-3 Ex. 101 | 5709-26-5 Ex. 102 |
|---|---|---|---|---|---|---|---|---|---|
| Affinity ™ SM-8400 | 25 | 28 | 30 | 35 | 30 | 35 | 10 | 10 | 10 |
| 0.87 g/cm$^3$ $I_2$ = 200 g/10 min** | | | | | | | | 15 | |
| EVA (18 percent VA, 400 MI) | | | | | | | | | 15 |
| EnBA (35 percentBA, 320 MI) | | | | | | | | 15 | |
| Paraflint H4 | 20 | 25 | 20 | 20 | 25 | 25 | 25 | 25 | 25 |
| Eastotac H-100-R | 55 | 47 | 50 | 45 | 45 | 40 | 50 | 50 | 50 |
| Irganox 1010 | 0.2 | 0.2 | 0.2 | 0.2 | 0.2 | 0.2 | 0.3 | 0.3 | 0.3 |
| Visc. @ 350° F. (177° C.) | 3680 cps | 4370 cps | 5220 cps | 8680 cps | 4480 cps | 7700 cps | 1250 cps | 1030 cps | 840 cps |
| Peel (° F.) | 158.5 ± 2.72 | 155.8 ± 5.1 | 160.2 ± 5.6 | 154.8 ± 3.3 | 156.5 ± 2.9 | 159.6 ± 5.2 | 151.6 ± 2.0 | 156.5 ± 2.9 | 148.8 ± 1.7 |
| Shear (° F.) | 186.4 ± 2.99 | 194.4 ± 2.4 | 188.0 ± 1.76 | 189.2 ± 5.6 | 194.8 ± 2.2 | 193.8 ± 2.39 | 196.2 ± 1.6 | 194.8 ± 2.2 | 195 ± 2 |
| Cloud Pt. (° C.) | 101 | 103 | 102 | 104 | 106 | 102 | 90 | 95 | 95 |
| Open T. (° C.) | 75.5 | 76.1 | 71.5 | 78.2 | 78.1 | 77.3 | | 78.1 | 77.3 |
| Set temp (° C.) | 61.1 | 66.3 | 66.7 | 63.7 | 66.1 | 68.4 | | 66.1 | 68.4 |

TABLE EIGHTEEN B-continued

Packaging Adhesives

| Reference # | 5342-521 Ex. 94 | 5342-52-2 Ex. 95 | 5342-52-3 Ex. 96 | 5342-52-4 Ex. 97 | 5342-53-1 Ex. 98 | 5342-53-2 Ex. 99 | 5709-26-1 Ex. 100 | 5709-26-3 Ex. 101 | 5709-26-5 Ex. 102 |
|---|---|---|---|---|---|---|---|---|---|
| Bonding Test | | | | | | | | | |
| 70° F. (21° C.) | 95 percent FT | 95 percent FT | 100 percent FT | 100 percent FT | 98 percent FT | 99 percent FT | 100 percent FT* | 100 percent FT* | 100 percent FT* |
| 30° F. (−1° C.) | 40 percent FT | 80 percent FT | 75 percent FT | 90 percent FT | 85 percent FT | 95 percent FT | 100 percent FT* | 100 percent FT* | 100 percent FT* |

Adhesion to Mead Carrier-Kote high wet strength paperboard (average of two bonds): *Recycled Clay Coated Boardstock (front/back), 40° F. (4.4° C.) rather than 30° F. (−1° C.); **Substantially linear ethylene/1-octene interpolymer available from The Dow Chemical Company

TABLE EIGHTEEN C

Packaging Adhesives

| Reference # | Ex. 100 | Ex. 101 | Ex. 102 | Ex. 103 | Ex. 104 |
|---|---|---|---|---|---|
| 0.870 g/cm³ $I_2$ = 500 g/10 min** | 37.3 | 29.9 | 39.9 | | |
| 0.873 g/cm³; $I_2$ = 2200 g/10 min** | | | | 35 | 35 |
| Affinity ™ EG-8200 | | | | 5 | 5 |
| 0.890 g/cm³; $I_2$ = 500 g/10 min** | | 7.5 | | | |
| Sylvatac 1103 | | | | | 10 |
| Eastotac H-130-R | 29.9 | 29.9 | 29.9 | | |
| Eastotac H-100-R | | | | 25 | 29.7 |
| Bareco PX-100 | | | 29.9 | | |
| Paraflint H4 | 32.4 | 32.4 | | 29.7 | |
| Paraffin 155 | | | | 5 | 20 |
| Irganox 1010 | 0.3 | 0.3 | 0.3 | 0.3 | 0.3 |
| Visc. @ 350° F. (177° C.) | 793 cps | 810 cps | 961 cps | 1056 cps | 1386 cps |
| 100 g Peel (° F.(° C.)) | 131 (55.0) | 130 (54.4) | 138 (58.9) | 119 (48.3) | 108 (42.2) |
| 500 g Shear (° F.(° C.)) | 198 (92.2) | 203 (95.0) | 200 (93.3) | 199 (92.8) | 146 (63.3) |
| Open T. (° C.) | | | | 191 | 138 |
| Set temp (° C.) | | | | 124 | 117 |
| Cloud Pt. | | | | 205 | 140 |
| Bonding Test: | | | | | |
| −40° F. (−40° C.) | 87 percent FT | 50 percent FT | 78 percent FT | 68 percent FT | 84 percent FT |
| 0° F. (−17° C.) | 81 percent FT | 53 percent FT | 80 percent FT | 67 percent FT | 67 percent FT |
| 40° F. (4.4° C.) | 88 percent FT | 73 percent FT | 88 percent FT | 93 percent FT | 92 percent FT |
| 70° F. (21° C.) | 100 percent FT | 91 percent FT | 98 percent FT | 95 percent FT | 87 percent FT |
| 102° F. (38.9° C.) | 99 percent FT | 96 percent FT | 99 percent FT | 100 percent FT | 100 percent FT |

Adhesion to hard to bond corrugated, conditioned for 48 hours

Blends of Homogeneous Ethylene/α-Olefin Interpolymers and Oil:

Homogeneous ethylene/α-olefin interpolymers are compatible with large quantities of oil, particularly when the interpolymer has a density of less than 0.880 g/cm³ and a melt index ($I_2$) of 30 g/10 min. or less. The following Tables Nineteen A–E set forth various blends of homogeneous ethylene/α-olefin interpolymers and oil, and representative performance attributes thereof:

TABLE NINETEEN A

Blends of Oil with a Substantially Linear Ethylene/1-Octene Interpolymer Having a Density of 0.902 g/cm³ and an $I_2$ of 30 g/10 min

| Ingredient | 33-3 Ex. 105 | 33-4 Ex. 106 | 33-5 Ex. 107 | 33-9 Ex. 108 | 33-10 Ex. 109 | 33-11 Ex. 110 |
|---|---|---|---|---|---|---|
| Affinity ™ SM-1300 | 25 | 20 | 17.5 | 30 | 35 | 40 |
| Kaydol Oil | 70 | 70 | 70 | 70 | 70 | 70 |
| Wt-percent Oil | 73.7 | 77.7 | 80 | 70 | 66.7 | 63.6 |
| Oil Exudation? | yes | yes | yes | yes | yes | yes |

TABLE NINETEEN B

Blends of Oil with a Substantially Linear Ethylene/l-Octene Interpolymer Having a Density of 0.870 g/cm³ and an $I_2$ of 30 g/10 min.

| Ingredient | 33-12 Ex. 111 | 33-13 Ex. 112 | 33-14* Ex. 113 | 33-15 Ex. 114 |
|---|---|---|---|---|
| Affinity ™ SM-8400 | 25 | 30 | 35 | 40 |
| Kaydol Oil | 70 | 70 | 70 | 70 |
| Wt-percent Oil | 73.7 | 70.0 | 66.7 | 63.6 |
| Oil Exudation? | yes | yes | no | no |

TABLE NINETEEN C

Blends of Oil with a Substantially Linear Ethylene/l-Octene Interpolymer Having a Density of 0.868 g/cm³ and an $I_2$ of 0.5 g/10 min.

| Ingredient | 22-1 Ex. 115 | 22-2 Ex. 116 | 22-3* Ex. 117 | 22-4 Ex. 118 |
|---|---|---|---|---|
| Affinity ™ EG-8150 | 7 | 10 | 15 | 20 |
| Kaydol Oil | 70 | 70 | 70 | 70 |

TABLE NINETEEN C-continued

Blends of Oil with a Substantially Linear Ethylene/1-Octene Interpolymer Having a Density of 0.868 g/cm³ and an I₂ of 0.5 g/10 min.

| Ingredient | 22-1<br>Ex. 115 | 22-2<br>Ex. 116 | 22-3*<br>Ex. 117 | 22-4<br>Ex. 118 |
|---|---|---|---|---|
| Wt-percent Oil | 90.9 | 87.5 | 82.3 | 77.8 |
| Oil Exudation? | yes | yes | no | no |

*Denotes lowest amount of polymer to achieve a non-exuding blend

TABLE NINETEEN D

Blends of Oil with a Homogeneous Linear Ethylene/1-Butene Interpolymer Having a Density of 0.865 g/cm³ and an I₂ of 10 g/10 min.

| Reference #<br>Ingredient<br>Trade<br>Name | 51-1<br>Ex. 119 | 51-2<br>Ex. 120 | 51-3<br>Ex. 121 | 41-1b*<br>Ex. 122 | 41-2b<br>Ex. 123 | 41-3b<br>Ex. 124 |
|---|---|---|---|---|---|---|
| SLP-0592 | 15 | 20 | 25 | 30 | 35 | 40 |
| Kaydol Oil | 70 | 70 | 70 | 70 | 70 | 70 |
| Wt-percent Oil | 82.3 | 77.8 | 73.7 | 70.0 | 66.7 | 63.6 |
| Oil Exudation? | yes | yes | yes | no | no | no |

TABLE NINETEEN E

Blends of Oil with a Homogeneous Linear Ethylene/Propylene Interpolymer Having a Density of 0.865 g/cm³ and an I₂ of 5 g/10 min.

| Reference #<br>Ingredient<br>Trade<br>Name | 51-4<br>Ex. 125 | 51-5<br>Ex. 126 | 51-6<br>Ex. 127 | 41-4b*<br>Ex. 128 | 41-5b<br>Ex. 129 | 41-6b<br>Ex. 130 |
|---|---|---|---|---|---|---|
| SLP-0394 | 15 | 20 | 25 | 30 | 35 | 40 |
| Kaydol Oil | 70 | 70 | 70 | 70 | 70 | 70 |
| Wt-percent Oil | 82.3 | 77.8 | 73.7 | 70.0 | 66.7 | 63.6 |
| Oil Exudation? | yes | yes | yes | no | no | no |

*Denotes lowest amount of polymer to achieve a non-exuding blend

Examples 105–130 of Tables Nineteen A–E demonstrate the tremendous oil holding power of homogeneous ethylene/α-olefin interpolymers, particularly for homogeneous ethylene/α-olefin interpolymers having a density of less than 0.880 g/cm³ and a melt index ($I_2$) of 30 g/10 min. or less. These oil rich blends exhibit a gel-like character and would be useful for skin attachment adhesives, particularly when combined with both solid and/or liquid tackifying resins. Skin attachment adhesive may be applied to an article by means of slot coating, screen printing and spraying. Foaming of the adhesive to alter the compliance and adhesion properties is also contemplated. These gelatinous compositions are also surmised to have great utility in a variety of non-adhesive applications.

Adhesives Comprising Homogeneous Ethylene/α-Olefin Interpolymers and Polyamides

The adhesives of the invention may further comprise one or more polyamides. Representative hot melt adhesives comprising a homogeneous ethylene/α-olefin interpolymer and a polyamide, as well as representative performance attributes thereof, are set forth in the following Tables Twenty A and B.

Examples 131–143 yielded transparent, single phase adhesive compositions demonstrating the compatability of the homogeneous ethylene/α-olefin interpolymer with polyamides. All formulations yielded moderately high tack levels initially. Examples 133, 134, 135 and 136 were found to maintain moderate tack levels even after 72 hours of heat history. It is unexpected that the high softening point polyamides do not detract from the pressure sensitivity. Accordingly, the polyamides can be added to boost the performance of PSAs by increasing the heat resistance, creep resistances, and/or plasticizer resistance.

TABLE TWENTY A

Adhesives Comprising a Homogeneous Ethylene/α-Olefin Interpolymer/Polyamide Blends

| Ingredient | 13-1<br>Ex. 131 | 13-2<br>Ex. 132 | 13-3<br>Ex. 133 | 13-4<br>Ex. 134 | 14-1<br>Ex. 135 | 14-2<br>Ex. 136 | 26-1<br>Ex. 137 | 26-2<br>Ex. 138 |
|---|---|---|---|---|---|---|---|---|
| Affinity ™ EG-8200 | 25 | 30 | 25 | 25 | 30 | 30 | | |
| Affinity ™ EG-8150 | | | | | | | 25 | 30 |
| Kaydol Oil | 30 | 35 | 30 | 30 | 35 | 35 | 30 | 35 |
| Eastman H-130 | 55 | 45 | 45 | 45 | 35 | 35 | 30 | 20 |
| Polyamide HL-6088 | | | 10 | | 10 | | 15 | 15 |
| Polyamide HL-2660 | | | | 10 | | 10 | | |
| Irganox 1010 | 0.3 | 0.3 | 0.3 | 0.3 | 0.3 | 0.3 | 0.3 | 0.3 |
| Viscosity @ 350° F. (177° C.)(cps) | 13000 | 20050 | 18600 | 17100 | 32150 | 30200 | | |
| Gel | Not Tested | " | no | no | no | no | Not Tested | " |
| Skin | | " | no | slight | no | slight | | " |

TABLE TWENTY A-continued

Adhesives Comprising a Homogeneous Ethylene/α-Olefin Interpolymer/Polyamide Blends

| Ingredient | 13-1 Ex. 131 | 13-2 Ex. 132 | 13-3 Ex. 133 | 13-4 Ex. 134 | 14-1 Ex. 135 | 14-2 Ex. 136 | 26-1 Ex. 137 | 26-2 Ex. 138 |
|---|---|---|---|---|---|---|---|---|
| Color | " | | amber | dark amber | amber | dark amber | | " |
| Separation | " | | no | no | no | no | | " |

TABLE TWENTY B

Adhesives Comprising a Homogeneous Ethylene/α-Olefin Interpolymer/Polyamide Blends

| Ingredient | 38-1 Ex. 139 | 44-1 Ex. 140 | 44-2 Ex. 141 | 44-3 Ex. 142 | 44-4 Ex. 143 |
|---|---|---|---|---|---|
| EIP #4 | 35 | 25 | 20 | 15 | 22.5 |
| Kaydol Oil | 25 | 25 | 25 | 25 | 25 |
| Eastotac H-100 | 40 | 40 | 40 | 40 | 37.5 |
| Polyamide HL-2660 (H. B. Fuller) | | 10 | 15 | 20 | 15 |
| Viscosity @ 350° F. (cps) | 22500 | 9600 | 6400 | 3480 | 9000 |
| Appearance (Molten) | clear | hazy | hazy | hazy | hazy |
| Finger Tack | high | high | high | high | high |
| Adhesion Initial (Resistance) | high | high | high | high | not tested |
| Adhesion Aged 24 hrs/ 140° F. (60° C.) (Resistance) | moderate | high | high | high | not tested |
| Separation | no | no | no | slight | no |
| Gel | no | no | no | gel | no |
| Char | no | moderate | moderate | moderate | moderate |

Insulation Bonding

The adhesives of the present invention may find further utility in insulation bonding. The following Table Twenty-One sets forth representative examples of such formulations, and representative performance attributes thereof:

TABLE TWENTY ONE

Hot Melt Adhesives for Insulation Bonding

| | Ex. 144 | Ex. 145 |
|---|---|---|
| 0.890 g/cm³; I$_2$ = 2200 g/10 min** | 69.5 | |
| 0.890 g/cm³; I$_2$ = 200 g/10 min** | | 30.5 |
| Eastotac H-130R | 30.0 | |
| Escorez 5400 | | 44.5 |
| Polybutene M$_w$ 1300 | | 10.0 |
| Benzoflex 352 | | 10.0 |
| Irganox 1010 | 0.5 | 0.5 |
| Visc. @ 350° F. (177° C.) | 2680 cps | 1975 cps |
| SAFT (° F. (° C.)) | 182 (83) | 166 (74) |
| PAFT (° F. (° C.)) | 126 (52) | 132 (56) |
| Open time | less than 20 sec. | Less than 30–45 sec. |

**Homogeneous ethylene/1-octene interpolymers available from The Dow Chemical Company The above examples have been provided for the purpose of exemplification, rather than limitation. One skilled in the art will appreciate that the hot melt adhesives of the invention may be readily adapted for various applications. Accordingly, the invention shall be determined in accordance with the scope of the following claims:

The invention claimed is:

1. A pressure sensitive adhesive comprising:
   (a) from 5 to 95 weight percent of at least one interpolymer, which is a homogeneous ethylene/α-olefin interpolymer, characterized as having a density from 0.850 to 0.885 g/cm³ and a weight average molecular weight (Mw) of less than 20,000;
   (b) from 0 to 95 weight percent of at least one tackifier;
   (c) from 0 to about 90 weight percent of at least one plasticizer; and
   (d) from 0 to 90 weight percent of at least one wax;
   wherein the sum of components (b), (c), and (d) comprises 5 to 95 weight percent of said adhesive composition, wherein said adhesive is characterized as having a storage modulus (G'), at 25° C., of less than 1×10⁷ dynes/cm² (1 MPa), and a glass transition temperature (T$_g$) from −65° C. to 30° C., and
   wherein the α-olefin is randomly distributed within the ethylene/α-olefin interpolymer.

2. The adhesive of claim 1, wherein the glass transition temperature ranges from 0 to 30° C.

3. The adhesive of claim 1, wherein the ethylene/α-olefin interpolymer is prepared from at least one C$_3$–C$_{20}$ α-olefin, selected from the group consisting of propylene, isobutylene, 1-butene, 1-pentene, 1-hexene, 1-heptene, 4-methyl-1-pentene, and 1-octene.

4. The adhesive of claim 1, where the at least one interpolymer has a density of 0.870 g/cm³ or less.

5. The adhesive of claim 1, wherein the at least one tackifier is provided in an amount greater than 5 weight percent, and wherein the softening point of the tackifier ranges from being flowable at ambient temperature to about 130° C.

6. The adhesive of claim 1, wherein the at least one plasticizer is provided in an amount totaling less than 30 weight percent, and is
   (a) a phthalate, natural oil, paraffinic oil, naphthenic oil, aromatic oil, or
   (b) a cyclohexane dimethanol dibenzoate compound, or
   (c) a mixture of (a) and (b).

7. The adhesive of claim 1, further comprising from 3 to 70 weight percent of at least one second polymer, which is an ethylene homopolymer or an interpolymer of ethylene with at least one C$_3$–C$_{20}$ α-olefin, and wherein the at least one second polymer has:
   (i) a density of from 0.910 to 0.970 g/cm³,
   (ii) a number average molecular weight, as determined by gel permeation chromatography, of less than 6,000; and
   wherein the at least one tackifier is provided in an amount from 0 to 70 weight percent.

8. The adhesive of claim 1, wherein the adhesive further comprises a modifying or extending composition, selected from the group consisting of wax, styrenic block copolymers, polyamides, interpolymers or ionomers of ethylene and mixtures thereof.

9. The adhesive of claim 8, wherein the modifying or extending composition is selected from the group consisting of ethylene/acrylic acid, ethylene/methyl acrylate, ethylene/isobutyl acrylate, ethylene/n-butyl acrylate, ethylene/methyl methacrylate copolymers and mixtures thereof.

10. The adhesive of claim 1, further comprising a polyethylene having molecular weight of greater than 3,000.

11. The adhesive of claim 10, wherein the amount of the polyethylene ranges from about 20 to about 60 weight percent.

12. The adhesive of claim 1, wherein the homogeneous ethylene/α-olefin interpolymer is an interpolymer of ethylene, having greater than 30 weight percent, as determined by mass balance, of an α-olefin comonomer having from 3 to 20 carbon atoms.

13. A pressure sensitive adhesive consisting essentially of:
    (a) from 5 to 95 weight percent of a least one homogeneous ethylene/α-olefin interpolymer having a density from 0.850 to 0.885 g/cm$^3$ and a weight average molecular weight (Mw) of less than 20,000;
    (b) from 0 to 95 weight percent of at least one tackifier;
    (c) from 0 to 95 weight percent of at least one plasticizer;
    (d) from 0 to 95 percent of at least one wax;
    (e) at least one antioxidant; and
    wherein the sum of component (b), (c), and (d) comprises 5 to 95 percent of the adhesive composition, and wherein said adhesive is characterized as having a storage modulus (G'), at 25° C., of less than 1×10$^7$ dynes/cm$^2$ (1 MPa), and a glass transition temperature ($T_g$) from −65° C. to 30° C., and
    wherein the α-olefin is randomly distributed within the ethylene/α-olefin interpolymer.

14. A pressure sensitive adhesive consisting essentially of:
    (a) from 5 to 95 weight percent of at least one interpolymer, which is a homogeneous ethylene/α-olefin interpolymer, characterized as having a density from 0.850 to 0.885 g/cm$^3$ and a weight average molecular weight (Mw) of less than 20,000;
    (b) from 0 to 95 weight percent of at least one tackifier;
    (c) from 0 to about 90 weight percent of at least one plasticizer; and
    (d) from 0 to 90 weight percent of at least one wax; and
    wherein the sum of components (b), (c), and (d) comprises 5 to 95 weight percent of said adhesive composition, and wherein said adhesive is characterized as having a storage modulus (G'), at 25° C., of less than 1×10$^7$ dynes/cm$^2$ (1 MPa) and a glass transition temperature ($T_g$) from −65° C. to 30° C., and
    wherein the α-olefin is randomly distributed within the ethylene/α-olefin interpolymer.

15. The adhesive of claim 1, wherein the ethylene/α-olefin interpolymer is a copolymer of ethylene and one α-olefin.

16. The adhesive of claim 1, wherein the ethylene/α-olefin interpolymer comprises 9.1 to 12.5 mole percent of the α-olefin.

17. The adhesive of claim 1, wherein the adhesive comprises 10 to 75 weight percent of at least one tackifier.

18. The adhesive of claim 1, wherein the adhesive comprises 10 to 50 weight percent of at least one plasticizer (solid).

19. The adhesive of claim 17, wherein the adhesive comprises 10 to 50 weight percent of at least one plasticizer (solid).

20. The adhesive of claim 1, wherein the composition further comprises at least one additive selected from the group consisting of antioxidants, antiblock additives, pigments and fillers.

21. The adhesive of claim 1, wherein the composition further comprises at least one antioxidant.

22. The adhesive of claim 17, wherein the composition further comprises at least one additive selected from the group consisting of antioxidants, antiblock additives, pigments and fillers.

23. The adhesive of claim 17, wherein the composition further comprises at least one antioxidant.

24. The adhesive of claim 18, wherein the composition further comprises at least one additive selected from the group consisting of antioxidants, antiblock additives, pigments and fillers.

25. The adhesive of claim 19, wherein the composition further comprises at least one additive selected from the group consisting of antioxidants, antiblock additives, pigments and fillers.

* * * * *

UNITED STATES PATENT AND TRADEMARK OFFICE
CERTIFICATE OF CORRECTION

| | | |
|---|---|---|
| PATENT NO. | : 7,199,180 B1 | Page 1 of 1 |
| APPLICATION NO. | : 08/973779 | |
| DATED | : April 3, 2007 | |
| INVENTOR(S) | : Eugene R. Simmons et al. | |

It is certified that error appears in the above-identified patent and that said Letters Patent is hereby corrected as shown below:

On the Title Pg.

Please replace the paragraph on "Related U.S. Application Data" patent, with the following rewritten paragraph:

Item --(63) Continuation of application No. 08/615,750, filed on Mar. 14, 1996, now abandoned, and a continuation of application No. 08/616,406, filed on Mar. 14, 1996, now abandoned.--

Signed and Sealed this

Twenty-sixth Day of April, 2011

David J. Kappos
*Director of the United States Patent and Trademark Office*